United States Patent
Rodabaugh

(10) Patent No.: US 10,525,866 B2
(45) Date of Patent: Jan. 7, 2020

(54) SLIDE-OUT ROOM AND OPERATING MECHANISM AND COMPONENTS THEREOF

(71) Applicant: XL IP B.V., Nieuw-Lekkerland (NL)

(72) Inventor: Daniel K. Rodabaugh, Elkhart, IN (US)

(73) Assignee: XL IP B.V., Nieuw-Lekkerland (NL)

( * ) Notice: Subject to any disclaimer, the term of this patent is extended or adjusted under 35 U.S.C. 154(b) by 0 days.

(21) Appl. No.: 15/563,371

(22) PCT Filed: Mar. 31, 2016

(86) PCT No.: PCT/NL2016/050224
§ 371 (c)(1),
(2) Date: Sep. 29, 2017

(87) PCT Pub. No.: WO2016/159769
PCT Pub. Date: Oct. 6, 2016

(65) Prior Publication Data
US 2018/0086248 A1    Mar. 29, 2018

Related U.S. Application Data

(63) Continuation of application No. 15/085,373, filed on Mar. 30, 2016, now Pat. No. 9,944,215, which is a (Continued)

(51) Int. Cl.
*B60J 3/00*       (2006.01)
*B60P 3/34*       (2006.01)
*B60P 3/36*       (2006.01)

(52) U.S. Cl.
CPC .. *B60P 3/34* (2013.01); *B60P 3/36* (2013.01)

(58) Field of Classification Search
CPC ............ E05Y 2900/148; A01G 25/092; A47J 37/046; G03G 15/041; G03G 15/6502;
(Continued)

(56) References Cited

U.S. PATENT DOCUMENTS 5,332,276 A * 7/1994 Blodgett, Jr. ............. B60P 3/34
                                                            296/171
5,570,924 A * 11/1996 Few .......................... B60P 3/34
                                                            296/171
(Continued)

FOREIGN PATENT DOCUMENTS

| CA | 2562326 A1 | 4/2007 |
| CN | 201879416 U | 6/2011 |
| WO | 2014/115181 A2 | 7/2014 |

OTHER PUBLICATIONS

Aug. 23, 2016—International Search Report and Written Opinion of PCT/NL2016/050224.

*Primary Examiner* — Kiran B Patel
(74) *Attorney, Agent, or Firm* — Banner & Witcoff, Ltd.

(57) ABSTRACT

A slide-out room and operating mechanism includes a plurality of corner units (32) and a plurality of wall panels connected to the corner units. The slide-out room is receivable in a mounting structure. Each corner unit (32) includes a drive mechanism therein. The drive mechanisms cooperate with the mounting structure to enable selective translation of the slide-out room through the mounting structure in first and second opposing directions.

16 Claims, 19 Drawing Sheets

Related U.S. Application Data continuation of application No. 15/085,332, filed on Mar. 30, 2016, now Pat. No. 9,738,209, which is a continuation-in-part of application No. 14/545,162, filed on Mar. 31, 2015, now Pat. No. 9,738,208.

(58) Field of Classification Search
CPC .. B60P 3/34; B60P 3/341; B60P 3/343; B60H 1/00364; B60H 1/3201
See application file for complete search history.

(56) References Cited

U.S. PATENT DOCUMENTS

| | | | |
|---|---|---|---|
| 5,634,683 A | 6/1997 | Young | |
| 5,902,001 A * | 5/1999 | Schneider | B60P 3/34 296/171 |
| 6,338,523 B1 * | 1/2002 | Rasmussen | B60P 3/34 296/175 |
| 6,415,675 B1 * | 7/2002 | Schneider | B62D 33/08 188/69 |
| 6,428,073 B1 * | 8/2002 | Blodgett, Jr. | B60P 3/34 296/171 |
| 6,471,275 B1 * | 10/2002 | Kunz | B60P 3/34 296/171 |
| 6,698,813 B2 * | 3/2004 | Nonaka | B60N 2/06 180/90 |
| 6,702,353 B1 * | 3/2004 | Blodgett, Jr. | B60P 3/34 296/26.01 |
| 7,540,116 B1 * | 6/2009 | Martinson | B60P 3/34 277/644 |
| 8,091,940 B1 | 1/2012 | Buls et al. | |
| 8,366,168 B1 | 2/2013 | Ksiezopolski et al. | |
| 9,033,390 B1 * | 5/2015 | Ksiezopolski | B60R 13/06 296/26.13 |
| 2002/0047286 A1 * | 4/2002 | Nye | B60P 3/34 296/26.13 |
| 2002/0060467 A1 * | 5/2002 | McManus | B60P 3/34 296/26.01 |
| 2002/0171255 A1 * | 11/2002 | Eichhorn | B60P 3/34 296/26.01 |
| 2004/0066060 A1 * | 4/2004 | Rasmussen | B60P 3/34 296/165 |
| 2004/0174031 A1 * | 9/2004 | Rasmussen | B60P 3/34 296/26.01 |
| 2005/0179278 A1 * | 8/2005 | Yoder | B60P 3/34 296/26.13 |
| 2006/0197358 A1 * | 9/2006 | Franzini | B60P 3/34 296/156 |
| 2007/0063525 A1 * | 3/2007 | Howells | B60P 3/34 296/24.3 |
| 2007/0194587 A1 * | 8/2007 | Wolf | B60P 3/34 296/26.13 |
| 2008/0048464 A1 * | 2/2008 | Ksiezopolski | B60P 3/34 296/26.01 |
| 2008/0073925 A1 * | 3/2008 | Ksiezopolski | B60P 3/34 296/26.01 |
| 2008/0100003 A1 * | 5/2008 | Vance | F16J 15/3224 277/553 |
| 2008/0116707 A1 * | 5/2008 | Boaz | B60P 3/34 296/26.01 |
| 2008/0315607 A1 * | 12/2008 | Herson | B60P 3/34 296/26.13 |
| 2011/0025091 A1 * | 2/2011 | Schwindaman | B60P 3/34 296/171 |
| 2012/0035813 A1 | 2/2012 | Kreil | |
| 2012/0261944 A1 * | 10/2012 | Kreil | B60P 3/34 296/175 |
| 2013/0106130 A1 * | 5/2013 | Yoder | F16H 19/04 296/26.02 |
| 2013/0134731 A1 * | 5/2013 | Schwindaman | B60P 3/34 296/26.13 |
| 2013/0269262 A1 * | 10/2013 | Siegel | B60R 13/08 49/492.1 |
| 2013/0285406 A1 | 10/2013 | Siegel | |
| 2014/0001710 A1 * | 1/2014 | Siegel | B60R 13/06 277/630 |
| 2014/0175822 A1 * | 6/2014 | Kreil | B60P 3/34 296/26.13 |
| 2014/0225333 A1 * | 8/2014 | Siegel | B60P 3/32 277/630 |
| 2015/0040700 A1 * | 2/2015 | Walls | B60P 3/34 74/89.17 |
| 2015/0291236 A1 * | 10/2015 | Kseizopolski | B60P 3/34 277/637 |
| 2016/0114715 A1 * | 4/2016 | Newhouse | F16J 15/104 277/642 |
| 2016/0201893 A1 * | 7/2016 | Ksiezopolski | F21V 33/006 362/311.02 |
| 2016/0207438 A1 * | 7/2016 | Ksiezopolski | B60P 3/36 |
| 2016/0214524 A1 * | 7/2016 | Goode | B60P 3/34 |
| 2016/0243973 A1 * | 8/2016 | Goode | B60P 3/34 |
| 2016/0243974 A1 * | 8/2016 | Goode | F16J 15/025 |
| 2016/0288689 A1 * | 10/2016 | Rodabaugh | B60P 3/34 |
| 2018/0086248 A1 * | 3/2018 | Rodabaugh | B60P 3/36 |

* cited by examiner

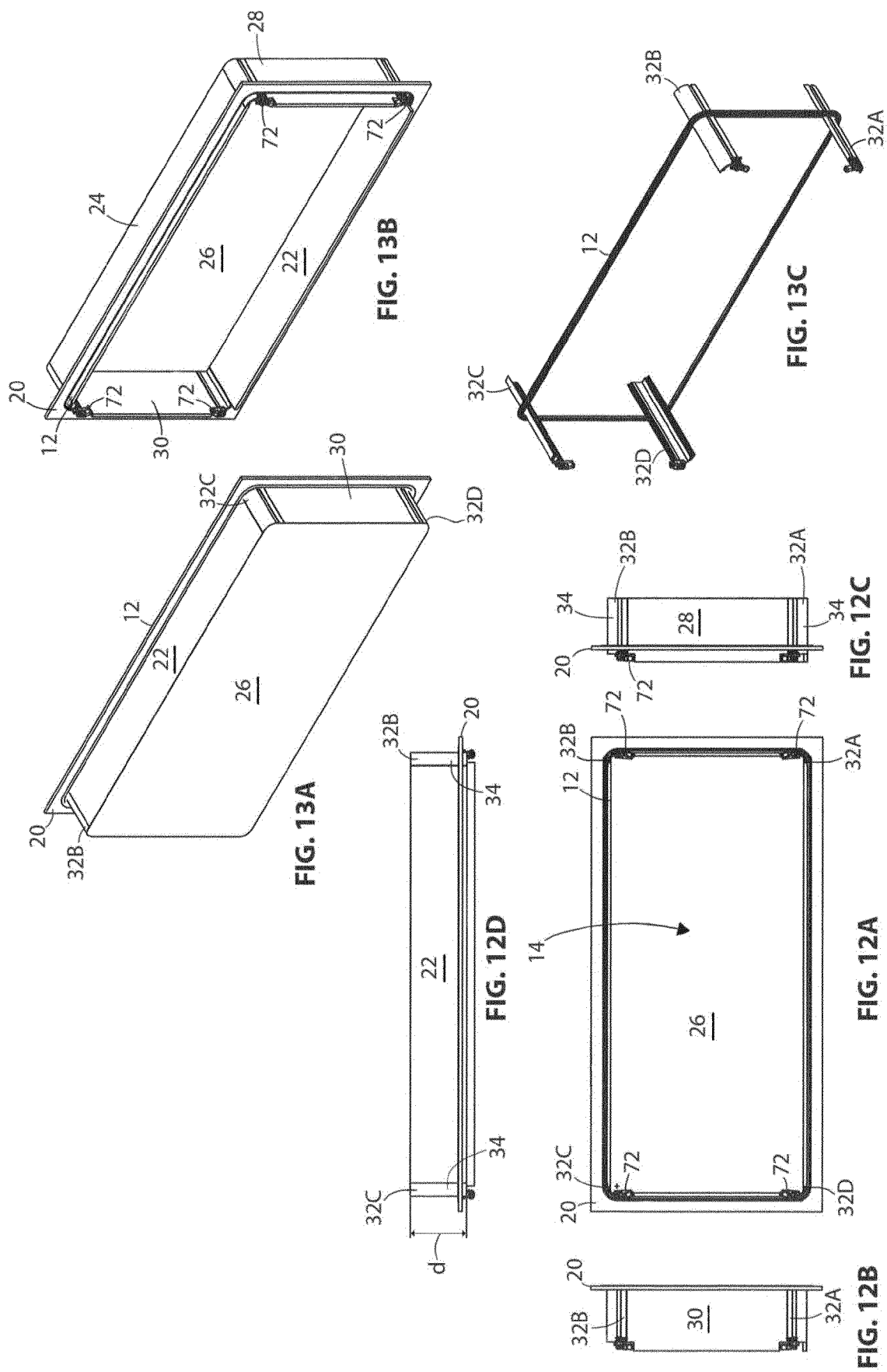

SLIDE-OUT ROOM AND OPERATING MECHANISM AND COMPONENTS THEREOF

CROSS-REFERENCE TO RELATED APPLICATIONS

This application is a U.S. National Stage application under 35 U.S.C. § 371 of International Application PCT/NL2016/050224 (published as WO 2016/159769 A1), filed Mar. 31, 2016 which claims the benefit of priority to U.S. application Ser. No. 14/545,162, filed Mar. 31, 2015; U.S. application Ser. No. 15/085,332, filed Mar. 30, 2016; and U.S. application Ser. No. 15/085,373, filed Mar. 30, 2016. Benefit of the filing date of each of these prior applications is hereby claimed. Each of these prior applications is hereby incorporated by reference in its entirety.

BACKGROUND AND SUMMARY OF THE DISCLOSURE

The disclosure is directed to slide-out rooms, operating mechanisms for slide out rooms, and components thereof. Such apparatus may be used in recreational vehicles and the like to selectively expand the interior space thereof. More specifically, a slide-out room installed in a vehicle may be extended to effectively increase the interior volume of the vehicle, and retracted to reduce the exterior footprint of the vehicle.

Known slide-out rooms often take the form of a box having five walls, namely, a floor, a ceiling, an outer wall and two opposing side walls. The sixth side of the "box" is substantially or sufficiently open to allow access to the interior of the slide-out room from the interior of the vehicle. The outer wall of the slide-out room may overlap the outer wall of the vehicle in which it is installed when the slide-out room is retracted. Seals for sealing the interface between the two walls generally need to conform to the contours of each of the walls. In applications where the wall contours are other than flat and parallel to each other, the seals may need to be complex. Complex seals can be costly and difficult to install.

Known mechanisms for operating such slide-out rooms include geared racks on the exterior surfaces of the floor or side walls of the room and motor-driven pinions mounted to the vehicle engaged with the geared racks. The pinions can be operated to drive the racks and the room to which they are attached in and out of the vehicle. At least some portions of such mechanisms may be exposed to the environment when the slide-out room is extended and may attract or otherwise engage with dirt, debris, or foreign objects that could hinder proper operation of the mechanisms.

Other known mechanisms for operating such slide-out rooms include hydraulic actuators engaged between the floor of the room and the frame of the vehicle. Such mechanisms may have difficulty in positioning the room in a manner that provides an effective seal between the outer wall of the room and the outer wall of the vehicle when the room is retracted.

BRIEF DESCRIPTION OF THE DRAWINGS

FIG. 12A is an interior elevation view of a slide-out room and operating mechanism according to the present disclosure installed in a wall of structure;

FIG. 12B is a side elevation view of a slide-out room and operating mechanism according to the present disclosure installed in a wall of structure, with the slide out room fully retracted;

FIG. 12C is a side elevation view of a slide-out room and operating mechanism according to the present disclosure installed in a wall of structure, with the slide out room fully extended;

FIG. 12D is a top plan view of a slide-out room and operating mechanism according to the present disclosure installed in a wall of structure, with the slide out room fully extended;

FIG. 13A is an exterior perspective view of a slide-out room and operating mechanism according to the present disclosure installed in a wall of structure, with the slide out room fully extended;

FIG. 13B is an interior perspective view of a slide-out room and operating mechanism according to the present disclosure installed in a wall of structure, with the slide out room fully extended;

FIG. 13C is an interior perspective view of a slide-out room and operating mechanism according to the present disclosure, with the slide out room in an intermediate position between fully extended and fully retracted, with respect to a mounting structure for the slide out room;

DETAILED DESCRIPTION OF ILLUSTRATIVE EMBODIMENTS

Figure 1:
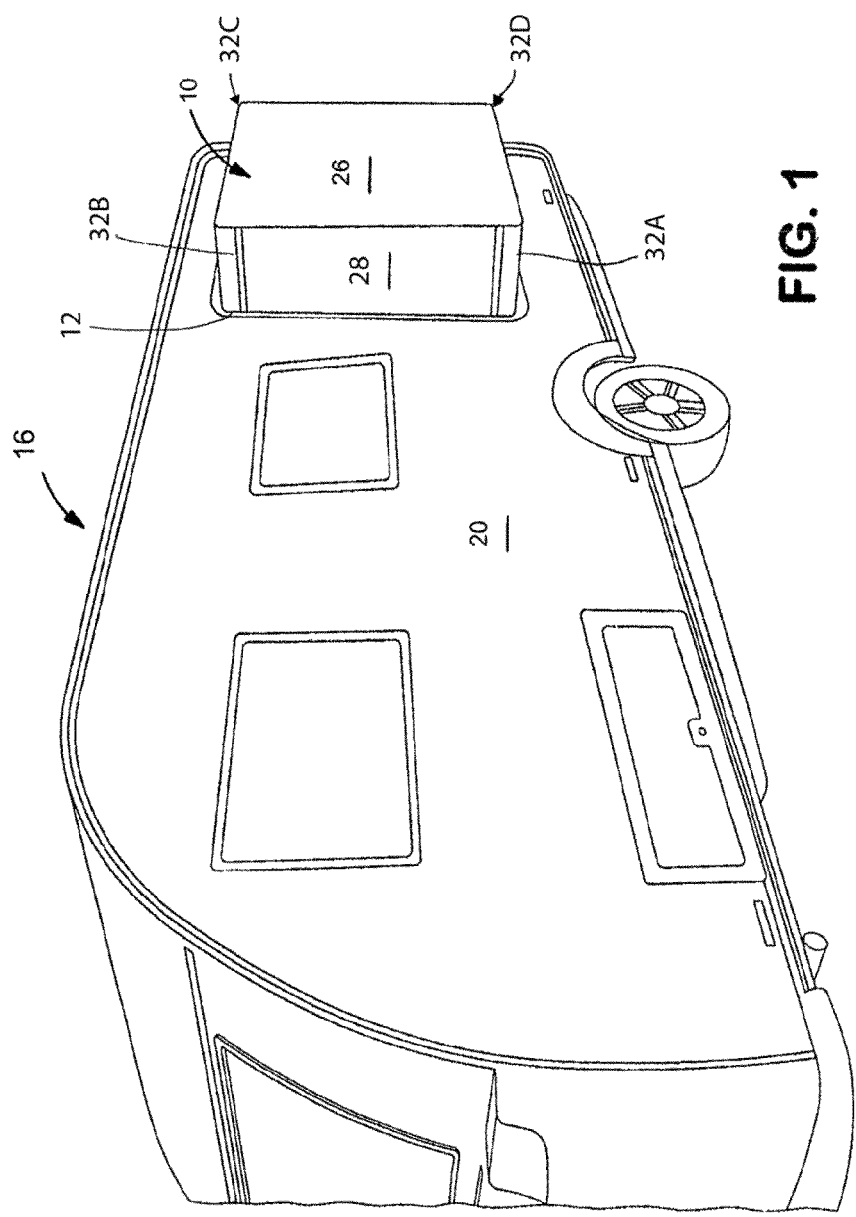
FIG. 1 is a perspective view of a travel trailer including a slide-out room and operating mechanism according to the present disclosure showing the slide-out room in an extended position.
Figure 2:
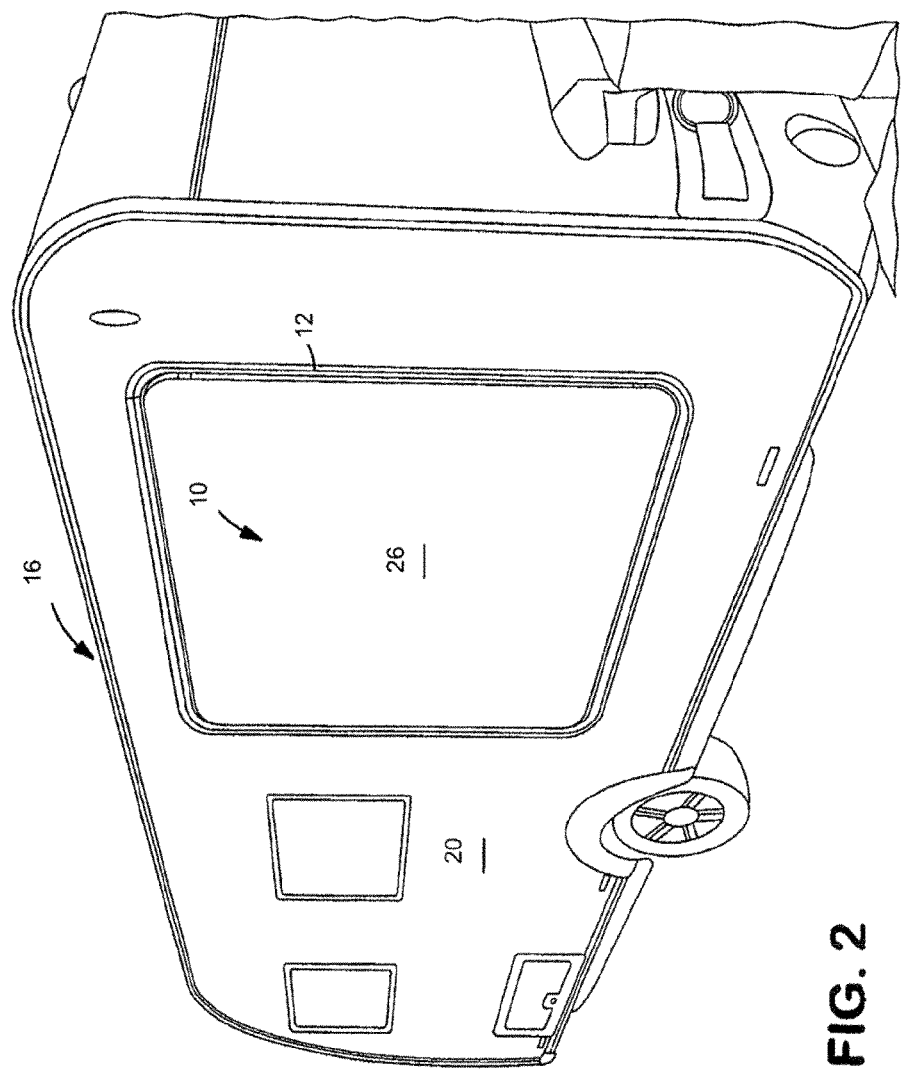
FIG. 2 is a perspective view of a travel trailer including a slide-out room and operating mechanism according to the present disclosure showing the slide-out room in a retracted position.
Figure 3:
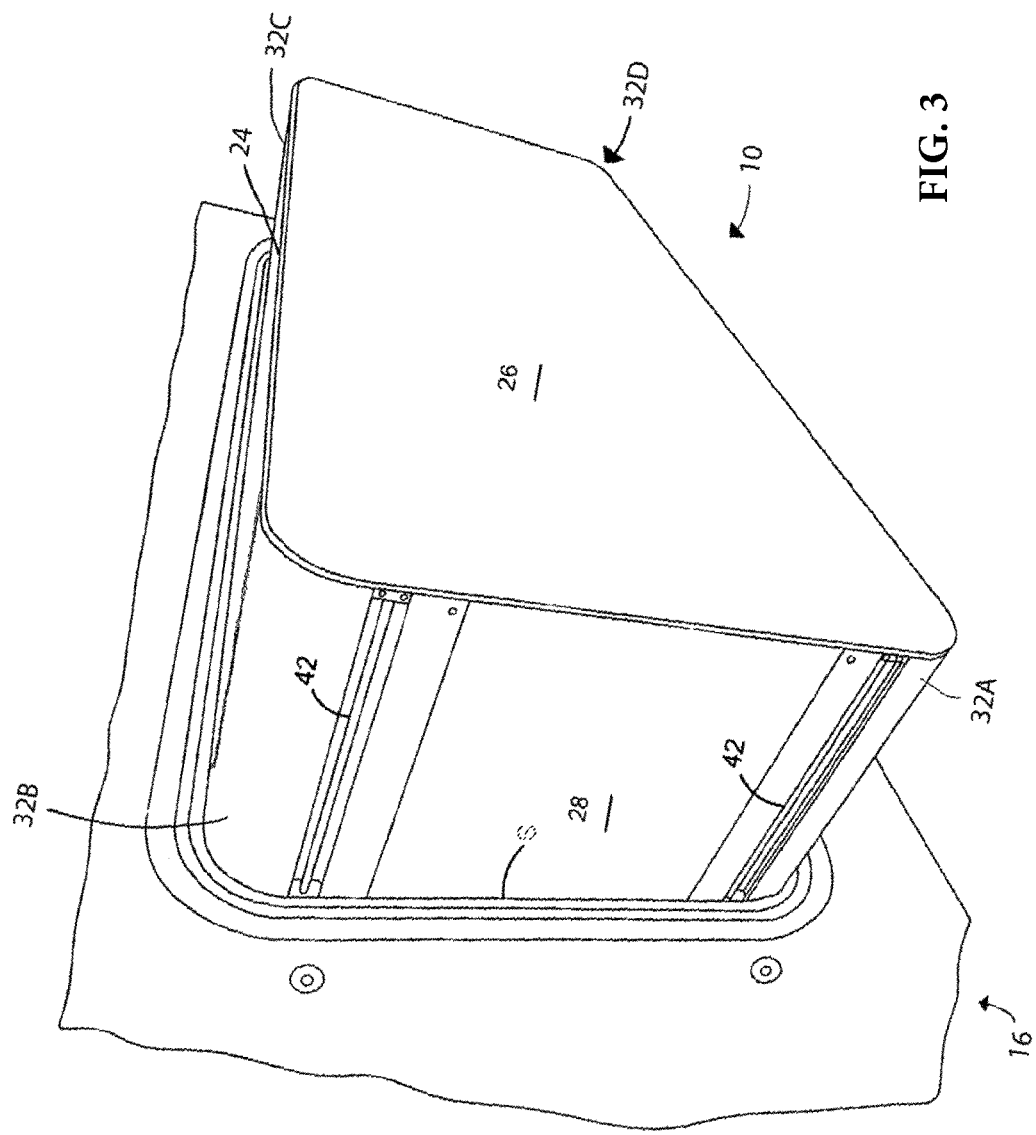
FIG. 3 is a detail perspective view of a slide-out room and operating mechanism according to the present disclosure.
Figure 4:
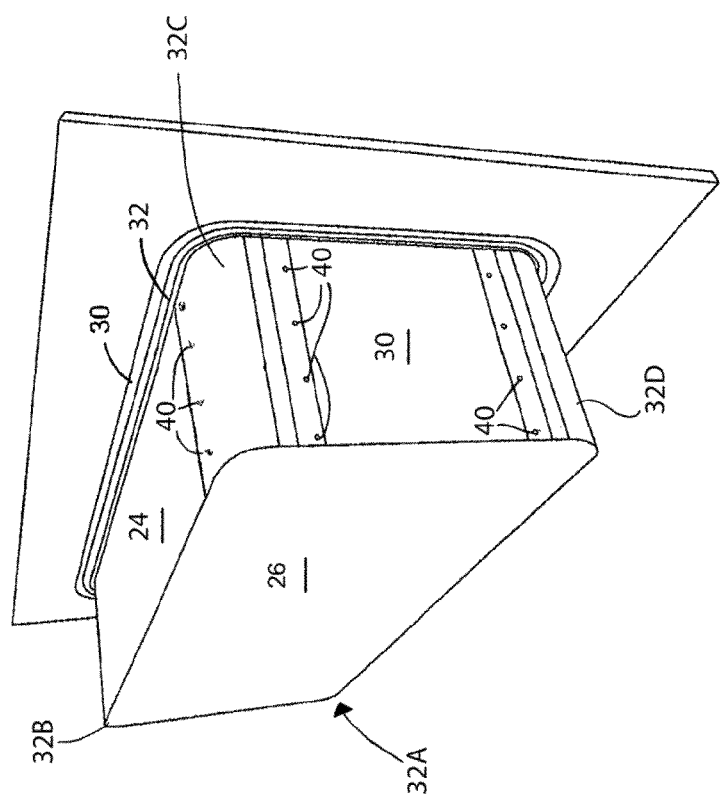
FIG. 4 is another detail perspective view of a slide-out room and operating mechanism according to the present disclosure.
Figure 5:
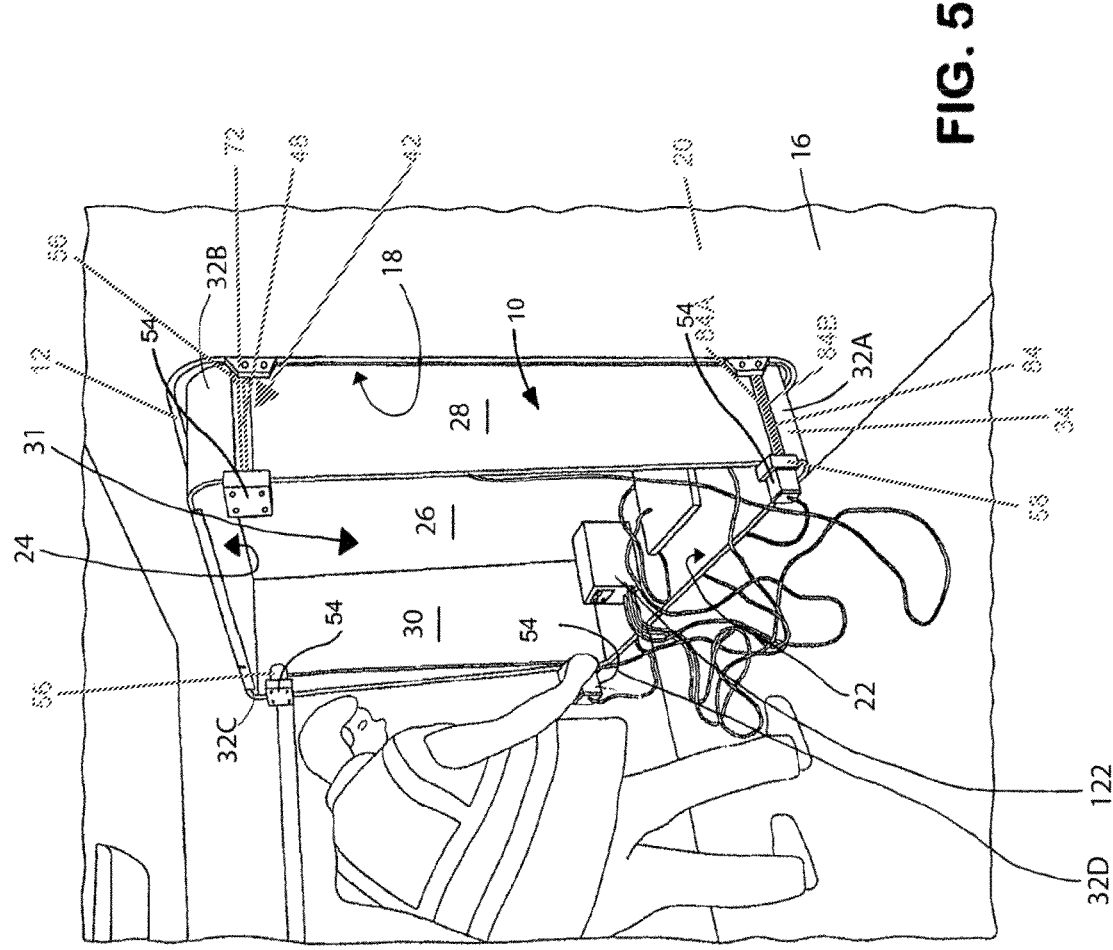
FIG. 5 is a perspective view of a slide-out room and operating mechanism according to the present disclosure installed in a mock-up of a side wall of a vehicle or other structure.
Figure 6:
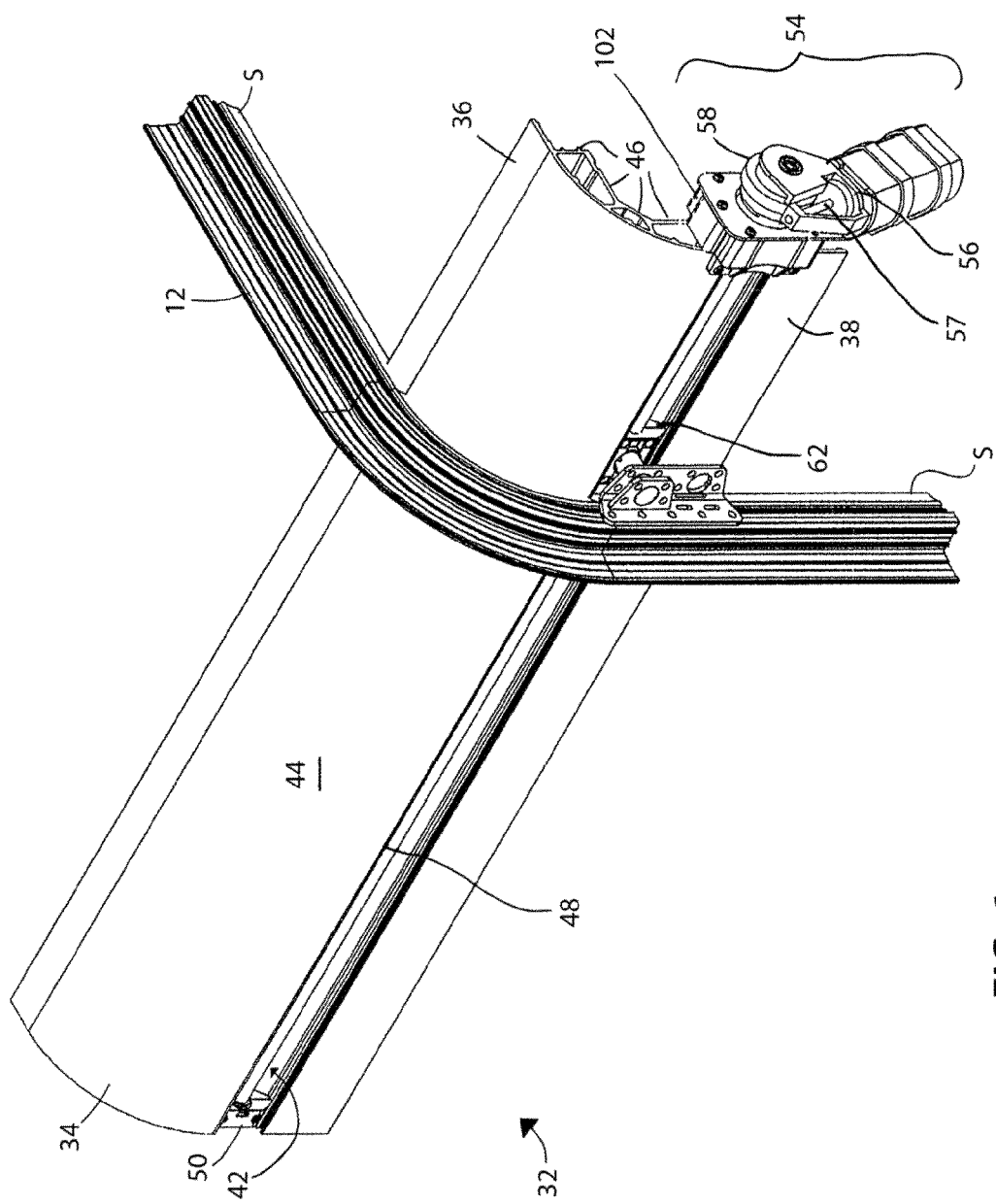
FIG. 6 is a perspective view of a corner unit as a component of a slide-out room attached to a portion of a mounting structure according to the present disclosure.
Figure 7:
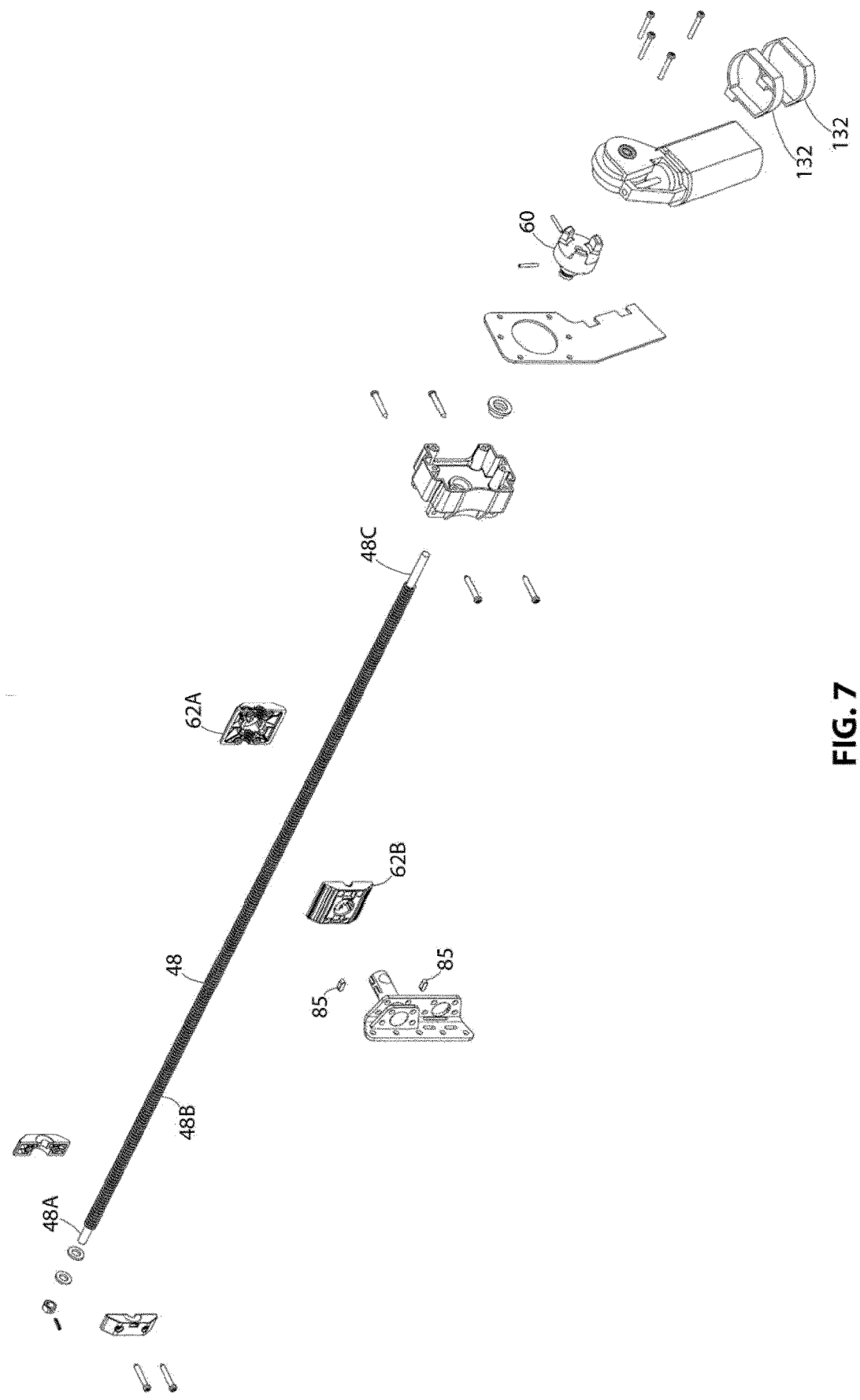
FIG. 7 is an exploded perspective view of an operating mechanism for a portion of a slide-out room according to the present disclosure.

References to orientation, for example, up, down, upward, downward, upper, lower, top, bottom, left, right, and the like, as may be used herein should be construed as referring to relative, and not absolute orientation, unless context clearly dictates otherwise.

The drawings show an illustrative embodiment of a slide-out room 10 and a mounting structure 12 having an opening 14 configured to slidingly receive the slide-out room therein. As will be discussed further below, the slide-out room 10 and mounting structure 12 cooperate to define an operating mechanism that may be used to selectively drive the slide-out room in first and second opposite directions through the opening 14 of the mounting structure 12.

As best shown in FIGS. 1-5, the slide-out room 10 and mounting structure 12 may be installed in an opening 18 in a wall 20 of a recreational vehicle 16, for example a travel trailer, or another structure. The wall 20 is shown in the drawings as a wall defining a side of the vehicle 16. In other embodiments, the wall 20 could be any other wall of the vehicle 16, for example, a rear wall or a ceiling (or roof) of the vehicle.

Figure 11:
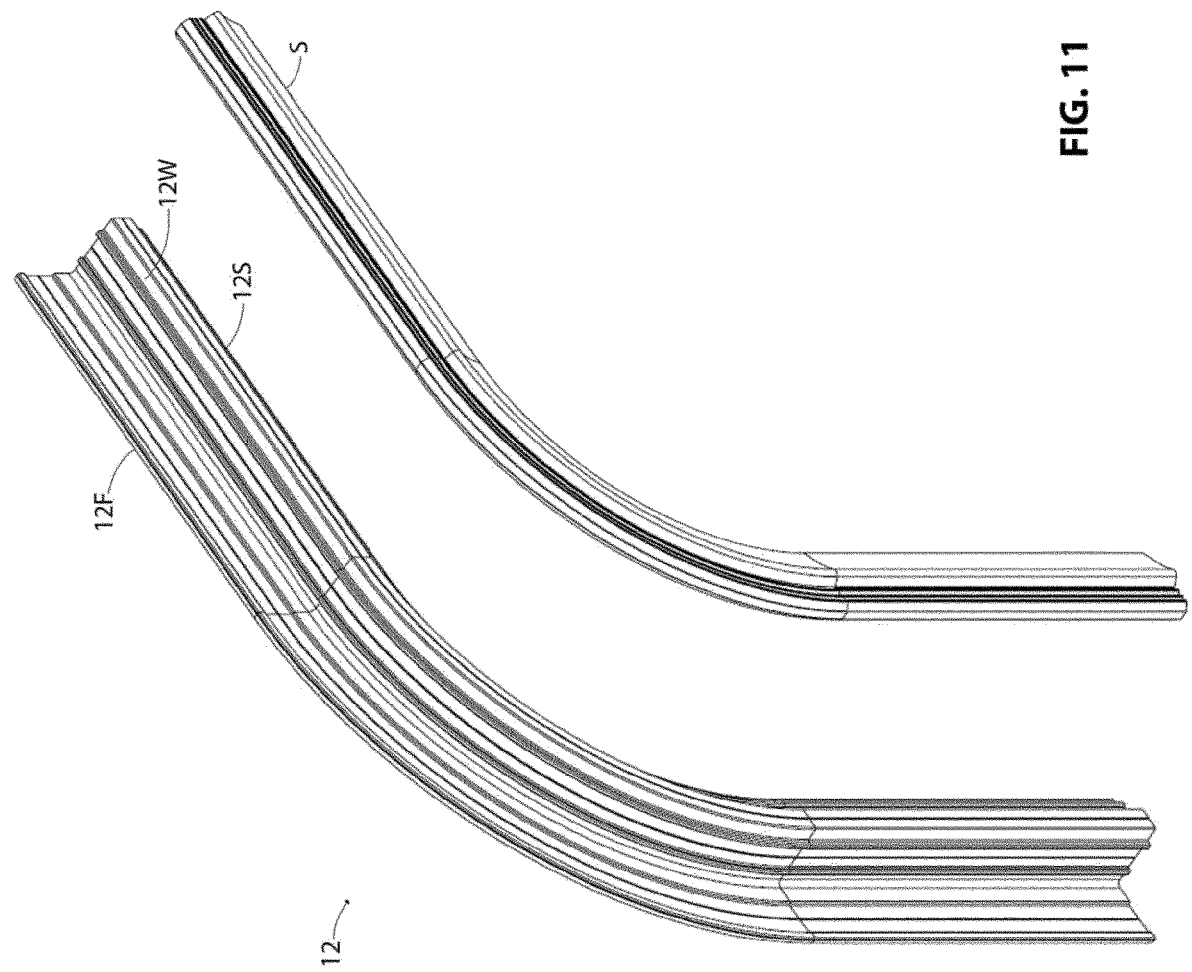
FIG. 11 is a detail perspective view of a mounting structure according to the present disclosure.

The mounting structure 12 is embodied as a peripheral frame configured for installation into the opening 18 in the wall 20 of the vehicle 16 or an opening in a wall of another structure. As best shown in FIG. 11, the peripheral frame of the mounting structure 12 may include a web 12W configured to be received within the opening 18 proximate the wall 20 defining the opening. The web 12W may be received loosely in the opening 18 or in sliding engagement with the wall 20 defining the opening. The peripheral frame of the mounting structure 12 may include a flange 12F configured to overlie the wall 20 about the opening 18. A seal (not shown) may be provided for installation between the flange 12F and the wall 20. A seal-receiving flange or groove 12S may be provided for receiving a peripheral seal S in an interior region of the peripheral frame for engagement with the slide-out room 10, as will be discussed further below. The seal S may be a continuous seal and may substantially conform to the peripheral frame about its entire circumference or a portion thereof. Apertures (not shown) may be provided in either of both of the web 12W and the flange 12F and configured to receive screws or other fasteners that may be used to secure the mounting structure 12 to the wall 20, either directly or through the use of intervening brackets (not shown). Alternatively or additionally, such brackets (not shown) could be riveted, welded, or bonded to the peripheral frame or integrally formed therewith. Similarly, apertures (not shown) may be provided in either of both of the web 12W and the flange 12F and configured to receive screws or other fasteners that may be used to secure a drive bracket, as will be discussed further below, to the mounting structure 12. Alternatively, such drive brackets could be riveted, welded, or bonded to the peripheral frame or integrally formed therewith.

The slide-out room 10 is shown as a six-sided box having five panels, namely, a floor 22, a ceiling 24, an outer wall 26, a first sidewall 28, a second sidewall 30 opposing the first sidewall. The sixth side of the "box" is opposite the outer wall 26 and is substantially open or sufficiently open to allow access to and from an interior space 31 of the slide-out room 10. The set of sides or panels excluding the outer wall 26 and the open side may be referred to herein as the peripheral sides or peripheral panels. As shown in the drawings, the peripheral panels 22, 24, 28, 30, the outer wall 26, and the open inner side may be generally rectangular.

The illustrative slide-out room 10 includes four corner units 32n interconnected by the peripheral panels 22, 24, 28, 30 and the outer wall 26. More specifically, a first corner unit 32A is connected to the outer wall 26, to the floor 22, and to the first sidewall 28, such that the outer wall, the floor and the first sidewall are generally mutually perpendicular. A second corner unit 32B is connected to the outer wall 26, to the first sidewall 28, and to the ceiling 24, such that the outer wall, the first sidewall and the ceiling are generally mutually perpendicular. A third corner unit 32C is connected to the outer wall 26, to the ceiling 24, and to the second sidewall 30, such that the outer wall, the ceiling and the second sidewall are generally mutually perpendicular. A fourth corner unit 32D is connected to the outer wall 26, to the second sidewall 30, and to the floor 22, such that the outer wall, the second sidewall and the floor are generally mutually perpendicular.

Each corner unit 32n includes a body 34. The body 34 may be molded, extruded from, for example, plastic or aluminum, or formed in other ways. The body 34 is shown as elongated relative to its width and height, but the body may have any desired length. The length of the body 34 typically, but not necessarily, would correspond to the depth of the slide-out room 10, for example, the distance d between the outer wall 26 and the open side of the slide out room 10, as best shown in FIG. 12D.

The body 34 includes a first attachment portion 36 configured for attachment to a first peripheral panel. For example, the first attachment portion 36 of the first corner unit 32A is configured for attachment to the floor 22 of the slide-out room 10. The body 34 also includes a second attachment portion 38 configured for attachment to a second peripheral panel, for example, a sidewall of the slide-out room. For example, the second attachment portion 38 of the first corner unit 32A is configured for attachment to the first sidewall 28 of the slide-out room 10.

In the illustrative embodiment or example, the first attachment portion 36 is shown as a flange extending from a main portion of the body 34 of the corner unit 32n. The flange may define a plurality of apertures 40 extending there through. The apertures 40 are configured to receive mechanical fasteners, for example, screws, bolts, or rivets, there through and through a corresponding one of the peripheral panels 22, 24, 28, 30 of the slide-out room 10. For example, the first attachment portion 36 of the first corner unit 32A is shown as being attached to the floor 22 of the slide-out room 10.

Figure 14A:
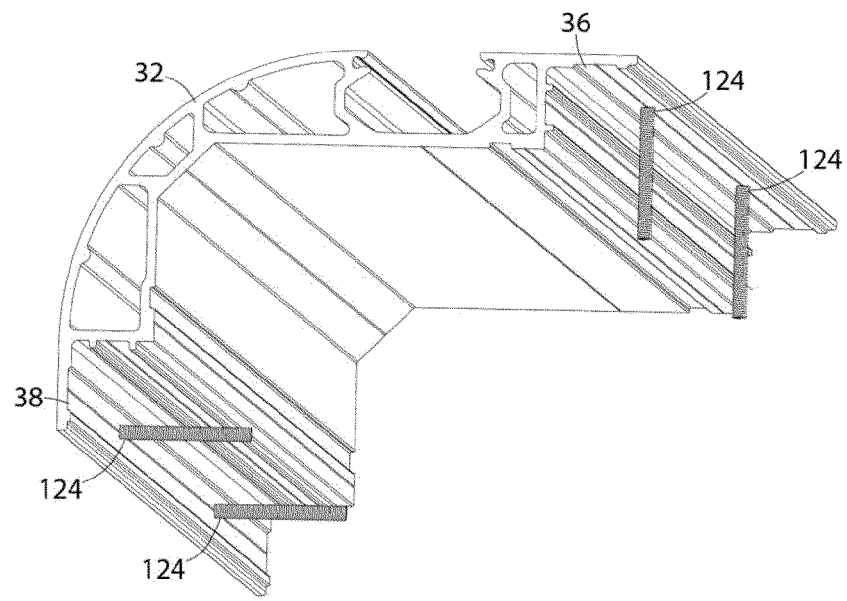
FIGS. 14A and 14B are detail views of means of attachment of peripheral panels to corner units of a slide-out room according to the present disclosure.
Figure 14B:
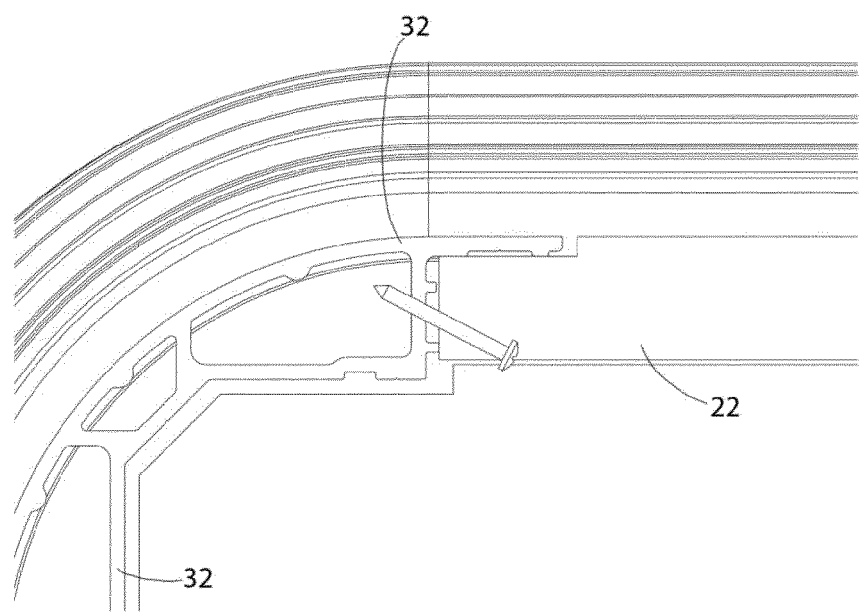

In other embodiments, the apertures 40 could be omitted and the first attachment portion 36 may be configured in another manner enabling attachment of the corresponding one of the peripheral panel 22, 24, 28, 30 thereto. For example, in an embodiment (not shown) the respective peripheral panel could be bonded to the first attachment portion 36 using adhesives. FIG. 14A shows an embodiment including studs 124 stud welded or other attached to the first attachment portion 36. The studs 124 could engage with a corresponding peripheral panel via apertures there through. FIG. 14B shows an embodiment wherein the a peripheral panel is attached to a stiffener, as will be discussed below, adjacent the first attachment portion 36. Another embodiment (not shown) could include a second flange (not shown)

extending from the main portion of the body 34 of the corner unit 32*n*. The second flange (not shown) could be generally parallel to the first flange. The first and second flanges could cooperate to define a pocket (not shown) configured to receive an edge portion of a corresponding one of the peripheral panels 22, 24, 28, 30 of the slide-out room 10. An embodiment could use any combination of the foregoing means and/or other means for connecting a peripheral panel to a corner unit 32*n*.

The second attachment portion 38 may be configured in a manner similar to the first attachment portion 36 or in another manner enabling attachment of another corresponding one of the peripheral panels 22, 24, 28, 30 thereto. The second attachment portion 38 of the first corner unit 32A is shown as being attached to the first sidewall 28 of the slide-out room 10. Because the slide-out room 10 shown has four peripheral panels defining a rectangular cross-section, the first and second attachment portions 36, 38 are configured for attachment to the corresponding peripheral panels such that the corresponding peripheral panels are generally perpendicular to each other.

The outer wall 26 may be attached to the edges of the peripheral panels 22, 24, 28, 30 that are proximate the outer ends of the corner units 32*n* using adhesives, fasteners, or another suitable mechanism.

The body 34 defines a channel 42 recessed from an outer surface 44 of the body. The channel 42 may be adjacent the first attachment portion 36 or the second attachment portion 38. The channel 42 may extend the entire length of the body from a first end thereof to a second end thereof, as shown. In other embodiments, the channel 42 may extend any lesser amount of the length of the body 34. The body 34 may include one or more ribs or stiffeners 46 or the like to provide structural integrity to the body.

A drive screw 48 is at least partially received within the channel 42. In an embodiment, the drive screw 48 is disposed within the channel 42 so that the outer diameter of the drive screw is generally recessed from or flush with the outer surface 44 of the body 34.

The drive screw includes a first end 48A, a second end 48C, and an intermediate portion 48B between the first end and the second end. The first end 48A of the drive screw 48 has a reduced diameter compared to the intermediate portion 48B of the drive screw, thereby defining a circumferential land 96 at the interface between the first end of the drive screw and the intermediate portion of the drive screw. The first end 48A of the drive screw may include an external machine screw thread. The intermediate portion 48B of the drive screw includes an external drive thread, for example, an Acme thread, having a thread pitch. The second end 48C of the drive screw 48 may, but need not, have a reduced diameter compared to the intermediate portion 48B of the drive screw.

A stop block 50 is attached to the body 34 at or near a first end of the body. As shown in the drawings, the stop block 50 may be fully or partially contained within the channel 42. The stop block 50 defines an aperture 86 there through. (In the illustrated embodiment, the aperture 86 is defined by the cooperation of first semi-cylindrical channel portions of a pair of respective stop block halves, as will be discussed further below.) The stop block 50 receives and supports the first end 48A of the drive screw 48 in the aperture 86 in rotatable engagement. Here, the stop block 50 also defines a first countersunk portion 88 extending inwardly from a first side of the stop block and a second countersunk portion 89 extending inwardly from a first second side of the stop block. (In the illustrated embodiment, the first countersunk portion 88 is defined by the cooperation of second semi-cylindrical channel portions of a pair of respective stop block halves, and the second countersunk portion 89 is defined by the cooperation of third semi-cylindrical channel portions of a pair of respective stop block halves, as will be discussed further below.)

The first countersunk portion 88 is configured to receive a first washer 94-1 and a nut 98 that may be threaded onto the first end 48A of the drive screw 48. The nut 98 may be secured to the drive screw 48 by a roll pin 100 inserted through corresponding apertures (not shown) extending into or through the nut and the first end 48A of the drive screw.

The second countersunk portion 89 is configured to receive a second washer 94-2. The first and second washers 94-1, 94-2 may function as thrust bearings receiving and reacting to thrust loads imparted thereto by the nut 98 and the drive screw 48 via the land 96, and limiting or precluding longitudinal displacement of the drive screw 48 with respect to the stop block 50. In an embodiment, the first and second washers 94-1, 94-2 may be omitted, and the surfaces of the first and second countersunk portions 88, 89 adjacent the aperture 86 may serve as thrust bearings.

Figure 8:
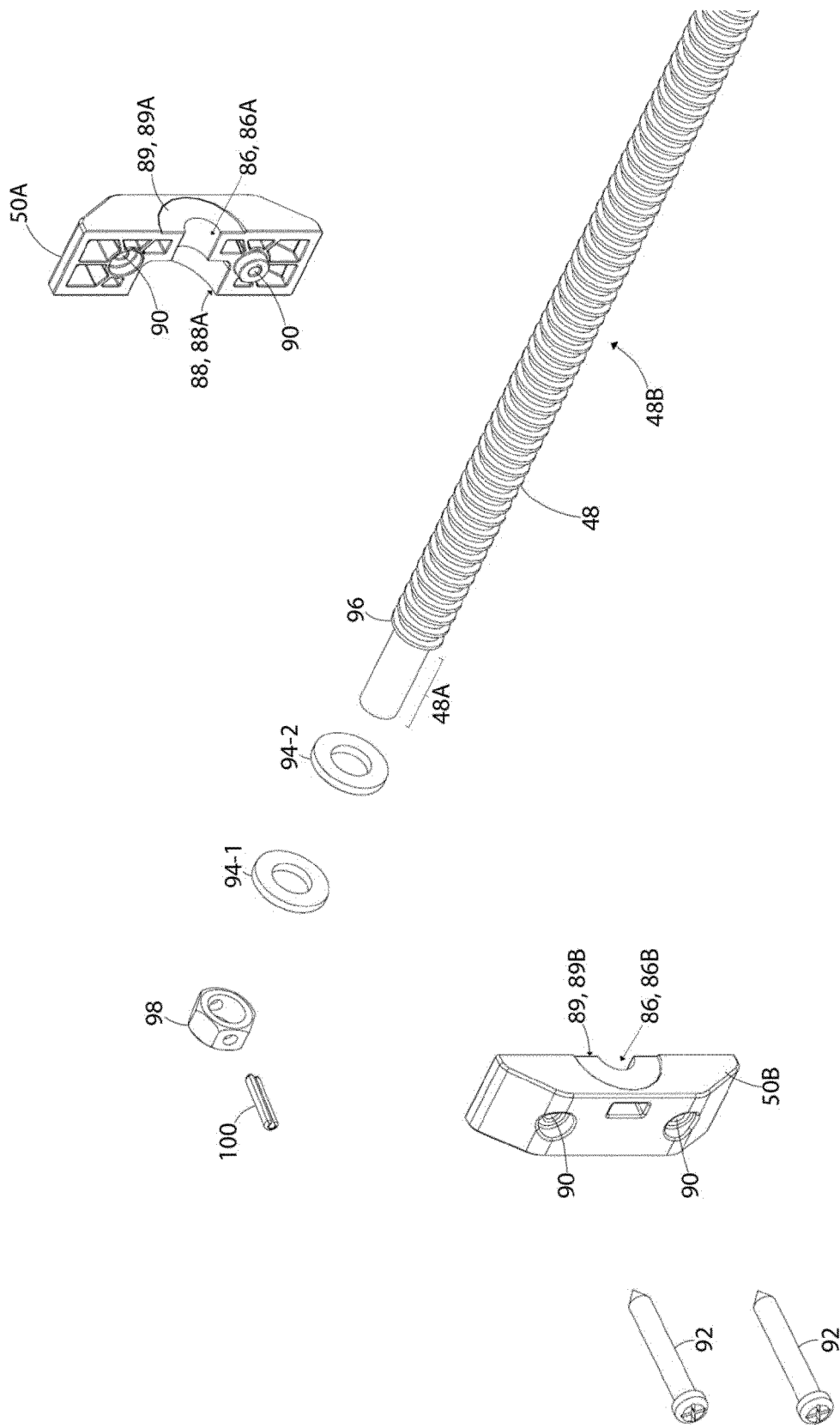
FIG. 8 is a detail perspective view of a stop block of an operating mechanism for a portion of a slide-out room according to the present disclosure.
Figure 9:
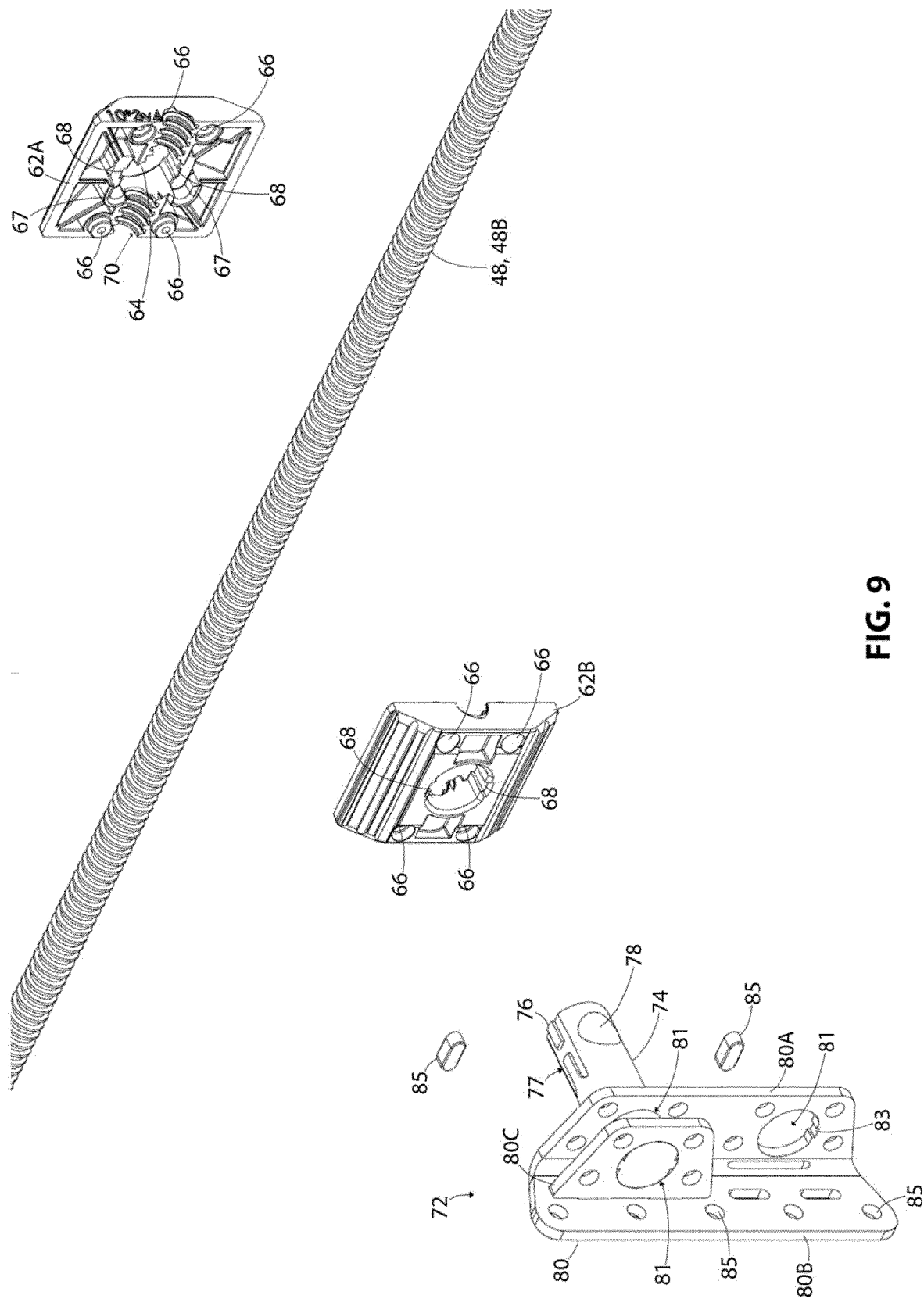
FIG. 9 is a detail perspective view of a drive block of an operating mechanism for a portion of a slide-out room according to the present disclosure.
Figure 10:
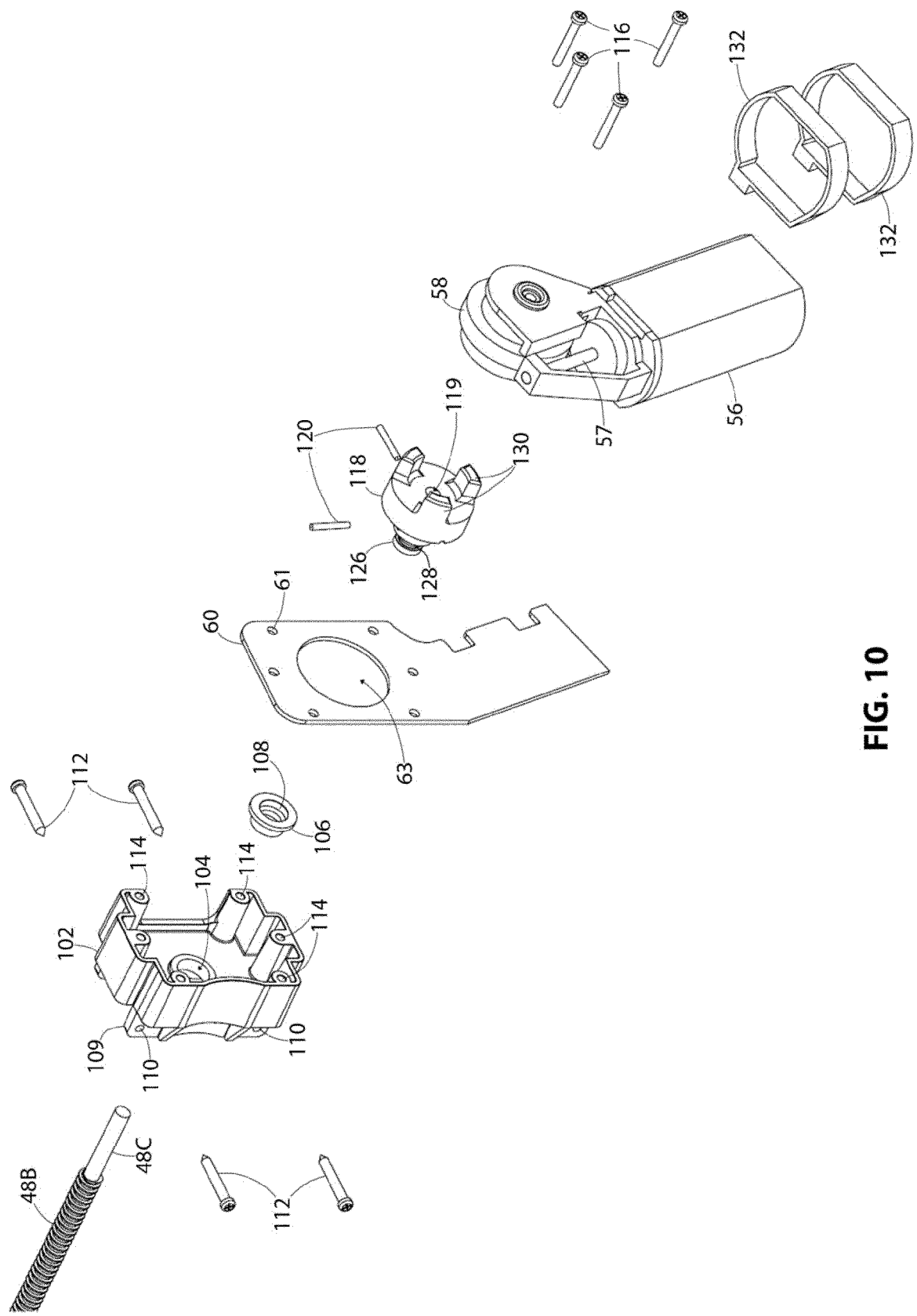
FIG. 10 is a detail view of a drive unit of an operating mechanism for a portion of a slide-out room according to the present disclosure.

In an embodiment, the stop block 50 may be formed monolithically. In the illustrated embodiment, as best shown in FIG. 8, the stop block 50 is embodied as first and second stop block halves 50A, 50B. Each of the first and second stop block halves 50A, 50B defines a first semi-cylindrical channel portion 86A, 86B, a second semi-cylindrical channel portion 88A, 88B, and a third semi-cylindrical channel portion 89A, 89B (portion 89B is obscured and not shown). When the first and second stop block halves 50A, 50B are joined together, as will be discussed further below, the first, second, and third semi-cylindrical channel portions cooperate to define the aperture 86 through the stop block 50 and the first and second countersunk portions 88, 89.

A drive screw support 102 is attached to the body 34 at or near a second end thereof. The drive screw support 102 defines an aperture 104 there through. The aperture 104 is configured to receive and support the second end 48C of the drive screw 48 in rotating engagement. A bushing 106 having an aperture 108 there through may be provided in the aperture 104 between the drive screw support 102 and the drive screw 48. The drive screw support 102 may include a mounting flange 109 defining apertures 110 configured to receive screws 112 or other fasteners that may be used to secure the drive screw support to the body 34. The drive screw support 102 may define further apertures 114 configured to receive further screws 116 for attaching a drive unit 54 thereto, as will be discussed further below.

A drive coupler 118 may be attached to the second end 48C of the drive screw 48 in fixed engagement therewith so that rotation of the drive coupler results in corresponding rotation of the drive screw 48. Here, the drive coupler 118 defines an aperture 119 configured to receive the second end 48C of the drive screw in snug engagement. The drive coupler 118 may be fixed to the drive screw 48 using one or more roll pins 120 inserted into corresponding apertures (not shown) formed in or through the drive coupler and the drive screw. In other embodiments, the drive coupler 118 could be fixed to the drive screw 48 in other ways. An annular projection 126 extends from a first end of the drive coupler 118. An O-ring, a D-ring, or a similar type of seal 126 may be received in a groove (obscured by O-ring, not shown) formed in the first end of the drive coupler 118. A plurality (three are shown, but fewer or more could be provided) of projections 130 extend from a second end of the drive coupler 118. The projections 130 are configured for mating engagement with corresponding structure located at the output of the gear train 58 or the output shaft 57 of the motor 57.

In the illustrative embodiment or example, a drive unit 54 is attached to a mounting plate 60. The drive unit 54 may be attached to the mounting plate 60 using tie straps 132 or by any other suitable mechanism. Here, the mounting plate 60 defines a plurality of screw-receiving apertures 61 and a drive coupler-receiving aperture 63. The mounting plate 60 may be attached to the drive screw support 102 using screws 116 extending through the screw-receiving apertures 61 and into the apertures 114 of the drive screw support 102.

The drive unit 54 includes a bi-directional electric motor 56 having an output shaft 57 and a gear train 58 connected to the output shaft. A second drive coupler (not shown) complementary to the drive coupler 118 may be provided at the output of the gear train 58 or integral with the gear train. For example, the second drive coupler (not shown) could be integrated with an output gear of the gear train 58. The second drive coupler (not shown) would be configured to engage with the drive coupler 118 so that rotation of the second drive coupler results in corresponding rotation of the first drive coupler.

In the illustrative embodiment or example, the output shaft 57 has an axis of rotation that is perpendicular to the axis of rotation of the drive screw 48. The gear train 58 is configured to receive rotational input from the output shaft 57 and provide a corresponding rotational output to the drive coupler 60 perpendicular to the rotational input. The gear train 58 may include worm and roller gears, beveled pinion gears, or other gears configured to effect the foregoing change in rotational direction. The gear train 58 also may be configured to provide a rotational output speed to the drive coupler 60 that is greater than, less than, or equal to the rotational input speed of the motor 56. In an embodiment, the motor 56 may be directly connected to the drive coupler 60. In such an embodiment, the gear train 58 could be omitted, and the second drive coupler could be provided at or integral with the output shaft 57.

A drive block 62 is slidingly received within the channel 42 and threadingly engaged with drive threads of the drive screw 48. The drive block 62 and the channel 42 are configured to substantially limit or preclude rotation of the drive block within the channel. In the illustrative embodiment or example, the drive block 62 is embodied as first and second drive block halves 62A, 62B. The first drive block half 62A includes a generally rectangular body defining an aperture 64 there through. The aperture 64 is generally circular and may define one or more keyways 68 corresponding to keys of a shaft of a drive bracket, as will be discussed further below. The first drive block half 62A also defines a plurality of screw holes and screw-receiving bosses 66. A first or interior face of the drive block defines a generally semi-cylindrical threaded portion 70 having drive threads. The drive threads of the threaded portion 70 are complementary to the threads of the drive screw 48. The second drive block half 62B may be identical to the first drive block 62A, the mirror image of the first drive block, or otherwise configured to enable assembly of the first drive block half to the second drive block half about the drive screw 48. In an embodiment, the drive block 62 is made of an inherently lubricious material, for example, DELRIN® plastic.

The thread pitch of the drive screw 48 and the drive block 62 may be a locking pitch. That is, the thread pitch may be selected so as to preclude rotation of the drive screw 48 solely in response to a longitudinal load applied thereto by the drive block 62. Alternatively or additionally, the gear train 58 may be self-locking so as to preclude rotation of the drive screw solely in response to a longitudinal load applied thereto by the drive block 62. This feature may enable maintenance of the drive block 62 and, therefore, the slide-out room 10 in an as-left position without the use of a motor brake or other mechanism for securing the room in place.

A drive bracket 72 is connected to the drive block 62 and to the mounting structure 12. More specifically, in the illustrative example or embodiment, the drive bracket 72 includes a generally cylindrical shaft 74 configured for fixed engagement with the aperture 64 of each of the first and second drive block halves 62A, 62B. An outer surface of the shaft 74 may be provided with one or more keys 76 at a first end thereof and configured for engagement with the keyways 68 of the apertures. A slot 77 may extend transversely through the key(s) 76. Also, the outer surface of the shaft 74 may be provided with one or more keys 76 at a second end thereof and configured for engagement with keyways of a mounting portion, as will be discussed further below. The shaft 74 may define a bore 78 extending there through and configured to receive the drive screw 48 in rotational relationship.

The drive bracket 72 also includes a mounting portion 80 configured to facilitate attachment to the mounting structure 12. The mounting portion 80 is shown as an angle bracket having a first flange 80A attached and generally perpendicular to a second flange 80B. Here, a third flange 80C extends generally perpendicularly from the second flange 80B and generally parallel to the first flange. Each of the first flange 80A and the third flange 80C defines a respective aperture 81 there through (the first flange 80A may also define a second aperture 81 there through. The shaft 74 is securely received in corresponding apertures 81 defined by the first flange 80A and the third flange 80C, for example, by welding and/or press-fit or interference fit engagement. The apertures 81 defined by the first flange 80A and the third flange 80C may define one or more keyways 83 configured for engagement with one or more corresponding keys 76 that may be provided at the second end of the shaft 74. One or more lock members 85 may be provided in connection with the drive block 62 and the drive bracket 72 to secure the shaft 74 to the drive block and thereby preclude or limit longitudinal movement of the shaft with respect to the drive block, as will be discussed further below.

Figure 18:
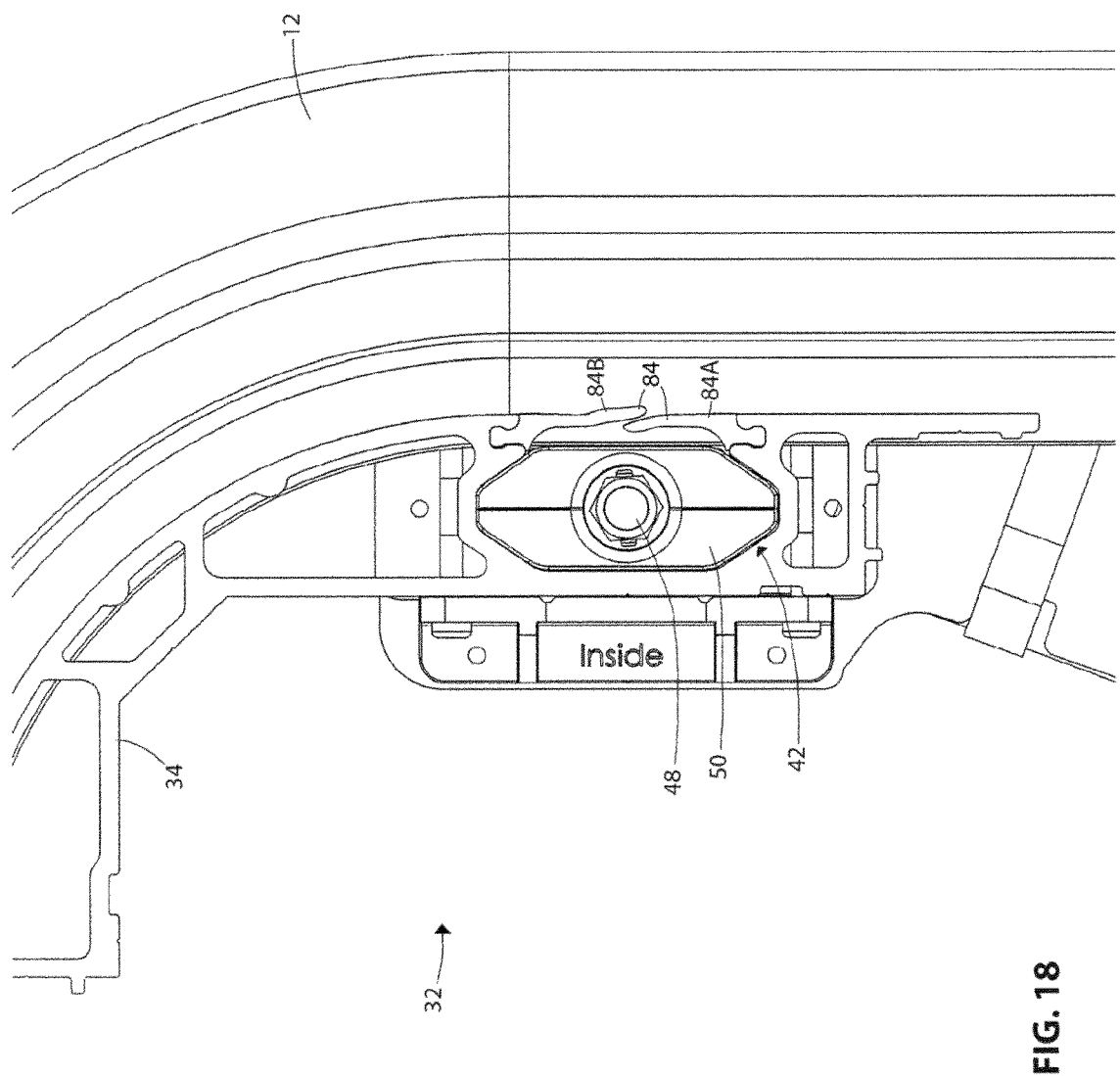
FIG. 18 is an end view of a corner unit of a slide-out room according to the present disclosure.

A seal 84 may cover the channel 42 and the drive screw 48. As best shown in FIG. 18, the seal 84 may include first and second seal members 84A, 84B. The seal 84 may be made of rubber or another flexible, resilient material. The first and second seal members 84A, 84B may be attached to the outer surface 44 of the body 34. A first end of the first seal member 84A may be attached to the body 34 proximate a first side of the channel 42. The first seal member 84A may extend from the foregoing point of attachment to the body 34 toward a second side of the channel 42 and across at least a portion of the channel. A first end of the second seal member 84B may be attached to the body 34 proximate a second side of the channel 42. The second seal member 84B may extend from the foregoing point of attachment to the body 34 toward the first side of the channel 42 and across at least a portion of the channel so that a second, free end of the second seal member overlaps a second, free end first seal member 84A. With the first corner unit 32A oriented such that the second side of the channel 42 is higher than the first side of the channel, this arrangement may preclude or mitigate intrusion of water or other contaminants into the channel.

The first and second seal members 84A, 84B are sufficiently flexible to be deflected from their normal position by the presence of the shaft 74 there between and sufficiently resilient to return to their normal states in the absence of the shaft 74, as will be discussed further below.

The shown corner units 32n may be assembled, for example, by inserting the first end 48A of the drive screw 48 through the second and first washers 94-2, 94-1 in that order. The nut 98 may then be threaded onto the first end 48A of the drive screw 48 at a distance from the land 96 of the drive screw to enable the first and second washers to be received, respectively, in the first and second countersunk portions 88, 89 of the first and second top block halves 50A, 50B. The nut 98 may be secured to the drive screw 48 using the roll pin 100 or other suitable means, for example, staking or LOC-TITE® applied to the mating threads of the nut and the first end of the drive screw. The first end 48A of the drive screw 48 may be received in the channel 86A of the first stop block half 50A and in the channel 86B of the second drive block half 50B and the first and washers 94-1, 94-2 may be received, respectively, in the first and second countersunk portions 88, 89.

The drive block 62 may assembled to the drive screw 48 by inserting the shaft 74 of the drive bracket through the aperture 64 of the second drive block half 62B in keyed engagement there with. The drive screw 48 may be inserted through the aperture 78 in the shaft 74. The locking members 85 may be fitted in the slots 77 of the keys 76. The second drive block half 62B may be placed adjacent the drive screw 48 so that the threads 70 of the second drive block half engage with the threads of the drive screw and so that locking member retainers 67 defined by the second drive block half engage with the locking members 85. The shaft 74 may be inserted through the aperture 64 of the first drive block half 62B in keyed engagement there with and placed adjacent the drive screw 48 so that the threads 70 of the first drive block half engage with the threads of the drive screw and so that locking member retainers 67 defined by the first drive block half engage with the locking members 85. Screws (not shown) may be threadingly received in the screw-receiving holes 66 of the first and/or second drive block halves 62A, 62B to fix the first and second stop block halves together.

The drive screw 48 may be inserted through the aperture 104 in the drive screw support 102. In embodiments including the bushing 106, the bushing may be inserted into the aperture 104 in the drive screw support 102, and the drive screw 48 may be inserted through the aperture 108 in the bushing. The drive coupler 120 may be fitted to the second end 48C of the drive screw 48 and fixed thereto using the roll pin(s) 120 or other suitable means.

The foregoing subassembly of the stop block 50, the drive screw 48 the drive block 62, the drive screw support 102, and the drive coupler 118 may be fitted and secured to the body 34 by sliding the stop block 50 into the channel 42 from the second end of the channel toward the first end of the channel, and securing the stop block to the body 34 by inserting the screws 92 through apertures 128 in the body (see FIG. 17) and threading the screws into the screw-receiving holes 90 of the first and/or second stop block halves 50A, 50B. The drive screw support 102 may be secured to the body 34 at or near the second end of the channel 42 by joining the drive screw support to the body, inserting the screws 112 through apertures in the body and threading the screws into the screw-receiving holes 110 of the mounting flange 109.

The drive unit 54 may be attached to the drive screw support 102 by inserting the drive coupler 118 attached to the drive screw 48 through the aperture 63 in the mounting bracket 60, engaging the drive coupler with the corresponding second drive coupler (not shown) of the drive unit, inserting the screws 116 through the apertures 61 of the mounting bracket and into the corresponding apertures 114 of the drive screw support.

The slide out room 10 may be assembled by attaching the peripheral panels to corresponding corner units 32n using any suitable means, for example, as discussed above, and by attaching the outer wall 26 to the edges of the peripheral panels 22, 24, 28, 30 that are proximate the outer wall. For example, the first attachment portion 36 of the first corner unit 32A may be attached to the floor 22, and the second attachment portion 38 of the first corner unit may be attached to the first sidewall 28. The second attachment portion 38 of the second corner 32B unit may be attached to the first sidewall 28, and the first attachment portion 36 of the second corner unit 32B may be attached to the ceiling 24. The first attachment portion 36 of the third corner unit 32C may be attached to the ceiling 24, and the second attachment portion 38 of the third corner unit may be attached to the second sidewall 30. The second attachment portion 38 of the fourth corner 32D unit may be attached to the second sidewall 30, and the first attachment portion 36 of the fourth corner unit 32D may be attached to the floor 22. (It should be evident that the first and fourth corner units 32A, 32D may be mirror images of each other, and the second and third corner units 32C, 32D may be mirror images of each other, so that the drive units 54 of each of the corner units may be located proximate the open side of the slide-out room 10. The first and second corner units 32A, 32B may be mirror images of each other, and the third and fourth corner units 32C, 32D may be mirror images of each other, except that the seal members of all of the corner units 32n may be arranged so that the upper of the seal members overlaps the lower of the seal members to mitigate or preclude water intrusion into the respective channels 42.) The outer wall 26 may be attached to the edges of the peripheral panels 22, 24, 28, 30 that abut the outer wall using adhesives, screws, clips, or other suitable fasteners.

The motors 56 of each of the corner units 32n may be electrically connected to a controller 122 configured to operate the motors of all of the corner units. The controller 122 may be configured to selectively operate the motors 56 in unison, with or without synchronization. The controller 122 may be configured to cause the motors to selectively rotate the corresponding drive screws 48 in a first direction of rotation or a second direction of rotation. In the illustrative example or embodiment, the threads of all drive screws 48 of the all corner units 32n have the same rotational orientation. It is also possible that the rotational orientation of the threads of the drive screws of some of the corner units, for example, corner units 32A and 32B is opposite to that of the other corner units, for example, corner units 32C and 32D. The controller 122 may be configured to cause the corresponding motors 56 to selectively rotate the corresponding drive screws 48 accordingly.

Figure 17:
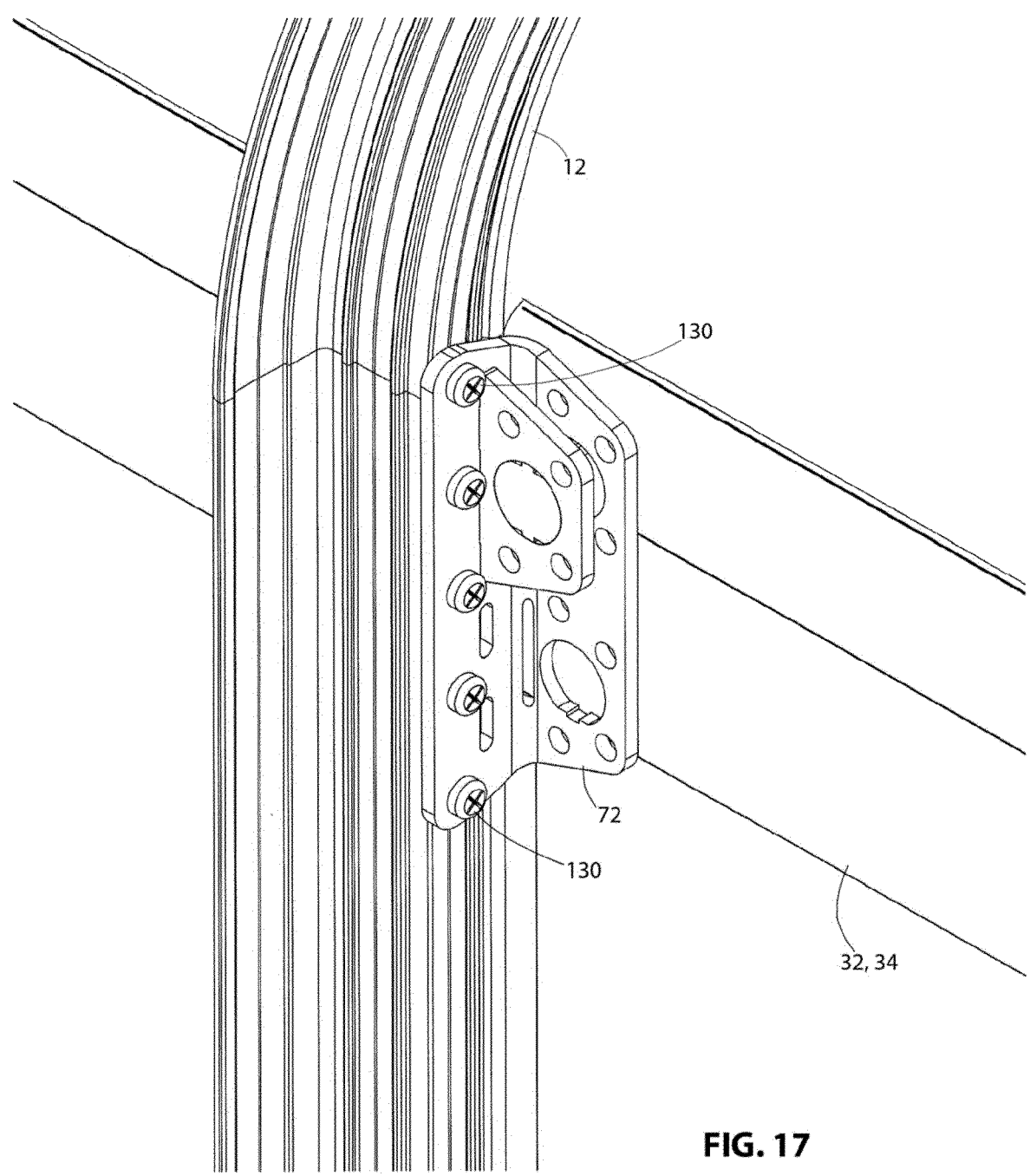
FIG. 17 is a perspective view showing a drive bracket attached to a mounting structure and to a corner unit of a slide-out room according to the present disclosure.

The slide-out room 10 may be inserted through the opening in the mounting structure 12 and the mounting portion 80 of the drive bracket 72 of each of the corner units 32n may be attached to the mounting structure at corresponding locations. The outer surfaces 44 of the corner units 32n and the peripheral panels of the slide out room may engage with the peripheral seal S installed to the mounting structure, as discussed above. The mounting portions 80 may be attached to the mounting structure 12 using any suitable means, for example, by welding or use of mechanical fasteners. For example, FIG. 17 shows the drive bracket 72 attached to the mounting structure 12 using screws 130 extending through corresponding apertures (obscured, not shown in FIG. 17) in the drive bracket and the mounting frame.

Figure 15A:
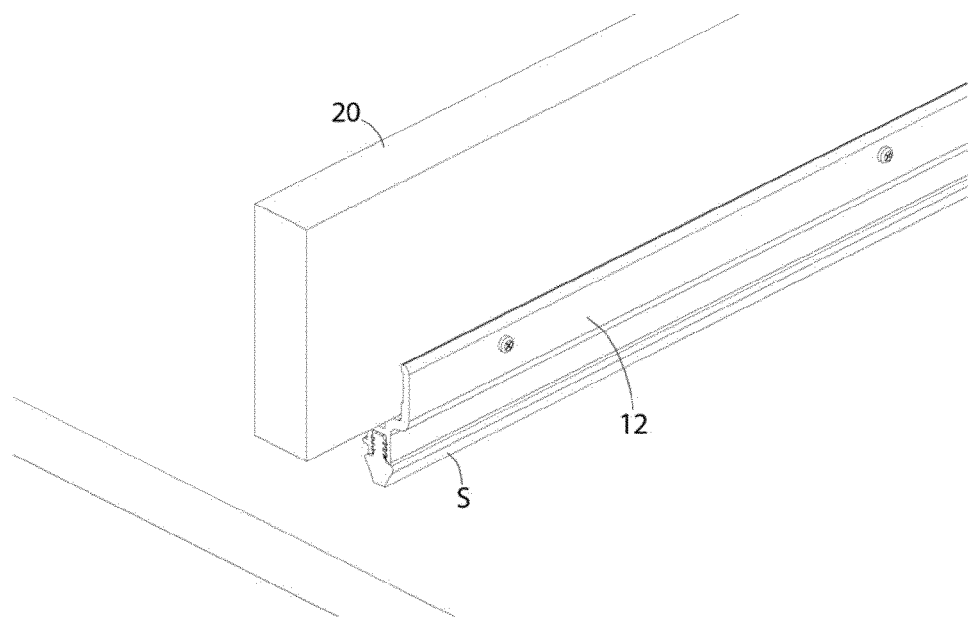
FIGS. 15A-15F are detail views of means of attachment of a mounting structure to a wall of another structure according to the present disclosure.
Figure 15B:
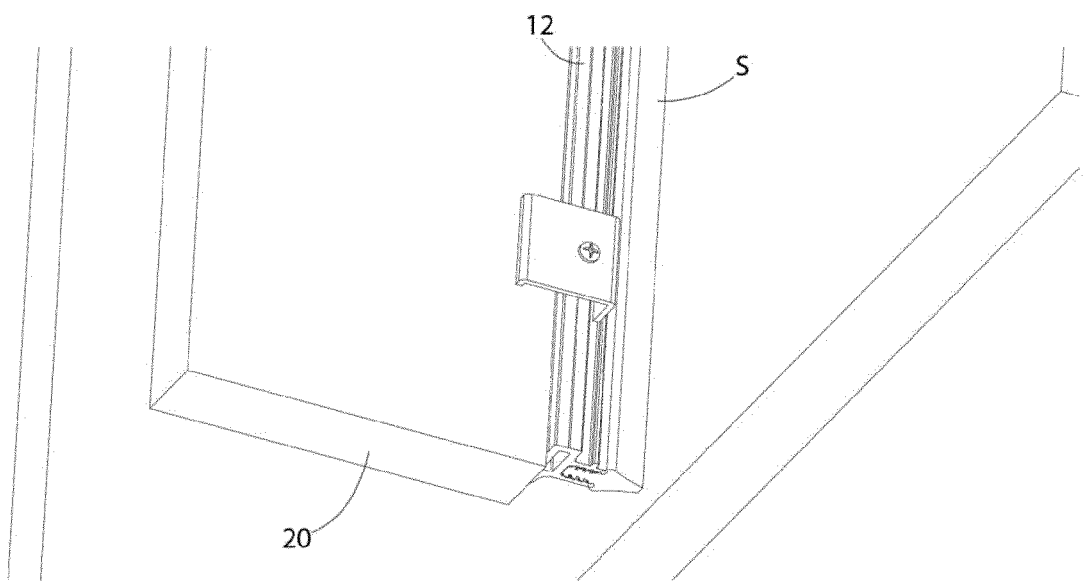
Figure 15C:
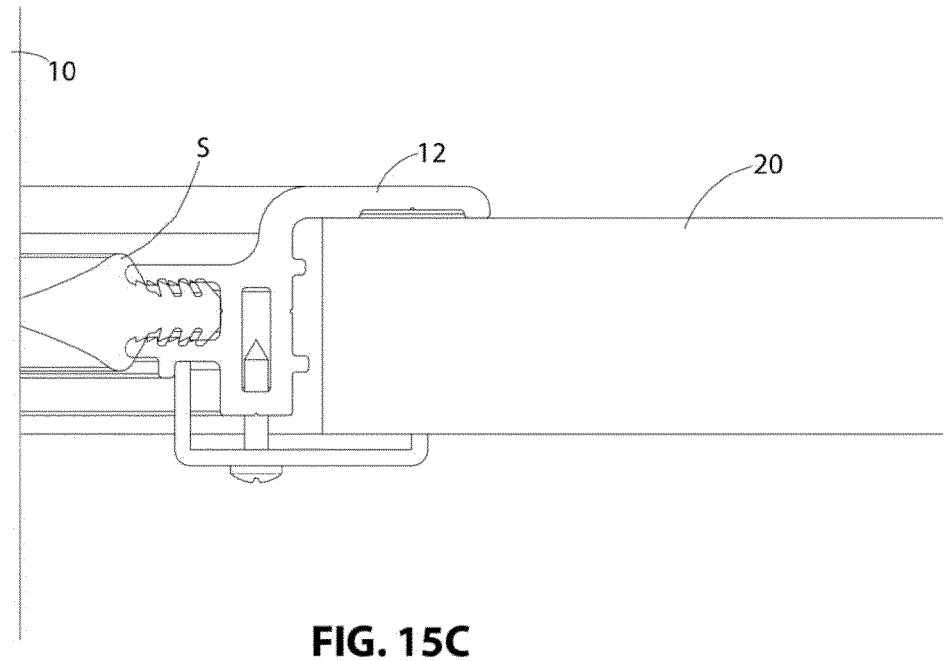
Figure 15D:
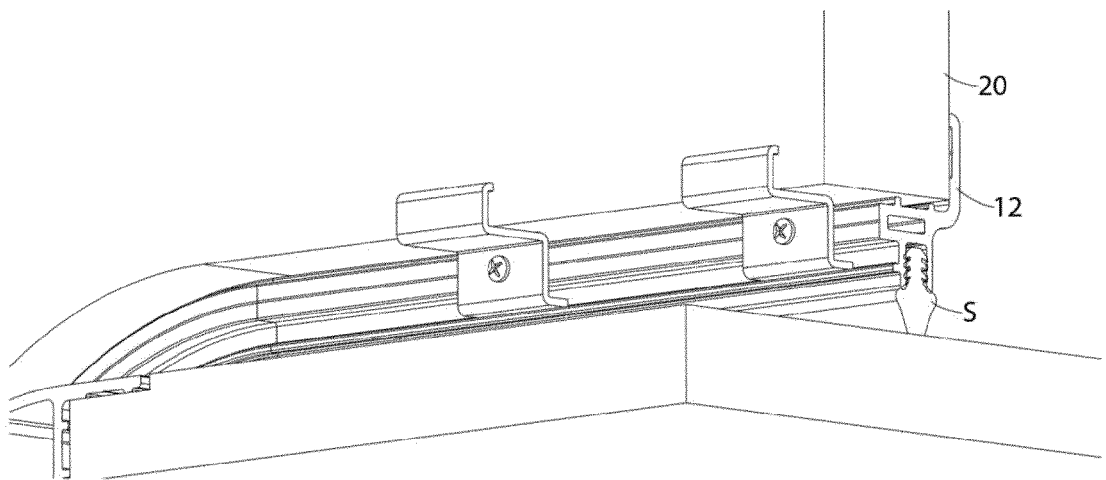
Figure 15E:
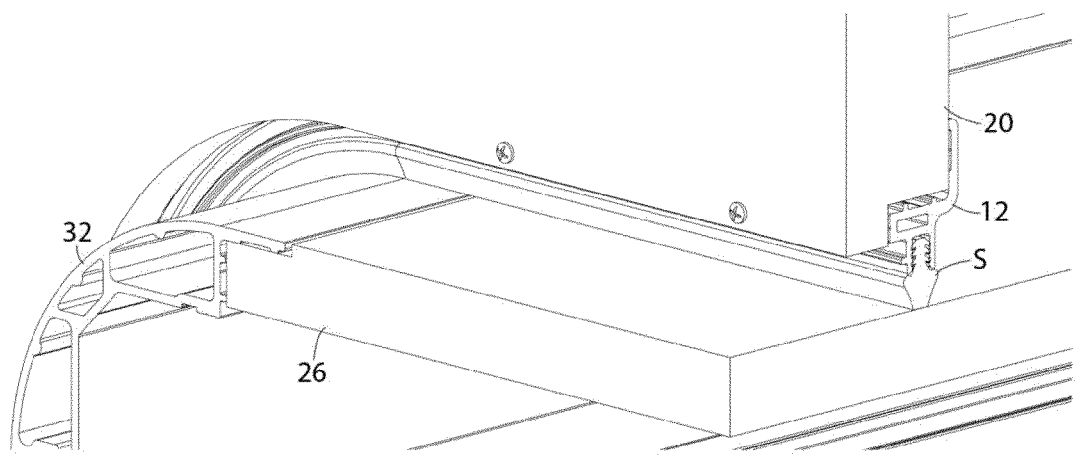
Figure 15F:
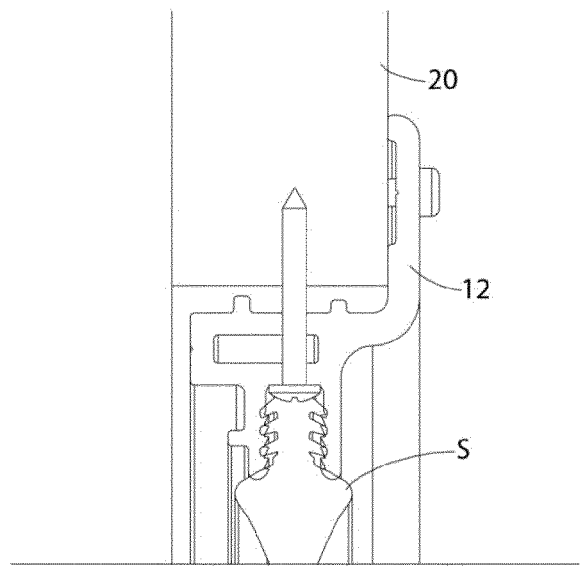
Figure 16:
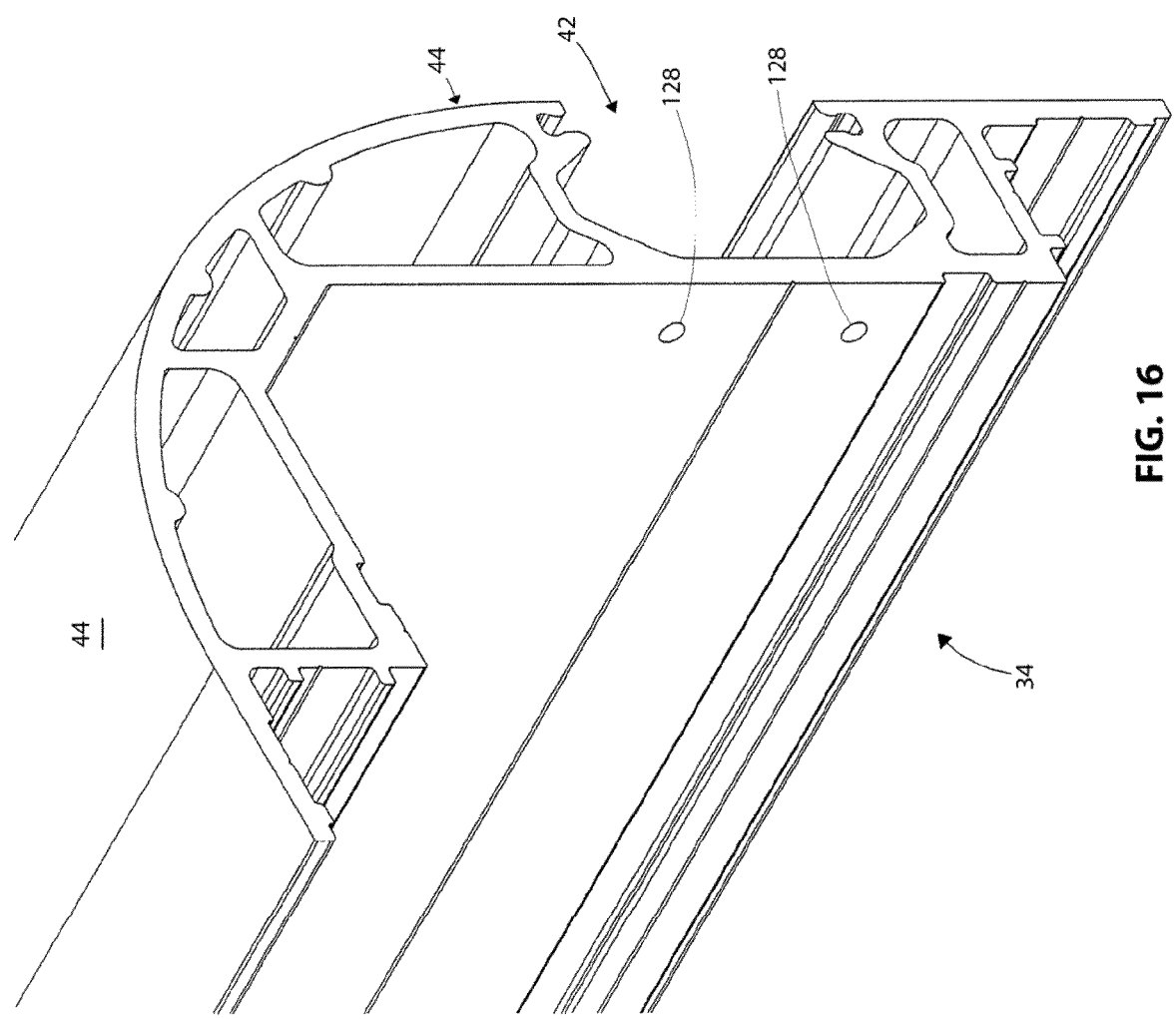
FIG. 16 is a partial perspective view of a portion of body of a corner unit of a slide-out room according to the present disclosure.

The slide-out room 10 and mounting structure 12 assembly may be installed as a unit into the opening 18 in the wall 20 of the vehicle 16 or other structure and secured to the wall or otherwise to the vehicle using any suitable means, for example, mechanical fasteners, clamps, brackets, or other means. FIGS. 15A-15F show various means for attaching the mounting structure 12 to the wall 20 of the vehicle, including mechanical fasteners extending through the mounting structure and into the wall (FIGS. 15A and 15E-15F) and clips extending between the mounting structure and the wall and secured to the mounting structure using mechanical fasteners (FIGS. 15B-15D).

The controller 122 may be electrically connected to a control switch (not shown) operable by a user to control the operation of the slide-out room 10. For example, the user may operate the switch and thereby cause the controller 122 to energize the motors 56 for operation in a first direction of rotation. Because the drive screws 48 are mechanically connected to the output shafts 57 of the motors 56, either directly or through the gear train 58, operation of the motors in a first direction of rotation results in operation of the drive screws in a corresponding first direction of rotation. Because the drive screws 48 are threadingly engaged with the corresponding drive blocks 62, and because the drive blocks are restrained from substantial rotation within the channels 42, rotation of the drive screws in a first direction of rotation causes the drive blocks to slide with respect to the corresponding channels 42 and bodies 34 in a first direction of translation. Because the drive blocks 62 are attached to the mounting frame via the drive brackets 72, the sliding of the drive blocks 62 with respect to the channels 42 and bodies 34 causes the bodies and, therefore, the slide-out room 10, to slide in a first direction of translation with respect to the mounting frame 12 and the wall 20 of the vehicle 16. The user may further operate the switch to yield the opposite effect.

The controller 122 and the slide-out room and operating mechanism may be configured so that an outer surface of the outer wall 26 of the slide-out room is substantially flush with an outer surface of the wall 20 of the vehicle or other structure when the slide-out room is in a normal, fully retracted position. The controller 122 and the slide-out room and operating mechanism also may be configured so that an outer surface of the outer wall 26 of the slide-out room may be retracted from the outer surface of the wall 20 of the vehicle or other structure and further from the seal S attached to the peripheral frame of the mounting structure to enable replacement of the seal without removing the slide-out room from the mounting structure.

The slide-out room 10 has been described herein as a right, six sided box. In other embodiments, the slide-out room 10 could have other configurations. For example, the outer wall 26 and open side of the slide-out room 10 could define n-sided polygons, and n panels could extend from corresponding edges of the outer wall to the open side. In an embodiment, the outer wall 26 and open side could define a triangle and three panels could join corresponding sides of the outer wall and the open side. In another embodiment, the outer wall 26 and open side could define a pentagon and five panels could join corresponding sides of the outer wall and open side. In further embodiments, the outer wall 26 and open side could have a curvilinear cross-section and a number of curved panels could join corresponding portions of the periphery of the outer wall and the open side.

Slide-out room embodiments having another n-sided polygonal outer wall 26 and open side configuration typically would include n corner units 32 configured for connection to the outer wall and two adjacent peripheral panels. For example, a slide-out room 10 having a triangular outer wall 26 and open inner side typically would include three corner units 32, and a slide-out room having a pentagonal outer wall and open inner side typically would include five corner units. Slide-out room embodiments having a curvilinear outer wall and open side may include any number of corner units 32 (typically two or more) configured for connection to the outer wall and to two curvilinear side panels. As such, the term "corner unit" may encompass a component configured to receive peripheral panels at a location that need not define an angled corner.

In general, a slide-out room system is provided for use in recreational vehicles. The system may provide the benefits that it is less likely to leak, less expensive to manufacture and maintain, reduces vehicle weight, is more reliable in operation over a longer period of time, and is aesthetically pleasing in appearance.

The slide-out system for recreational vehicles can use an outer wall which closes flush with the outer wall of the vehicles, radiussed corners about the slide-out periphery, a continuous peripheral seal, a drive mechanism mounted in the slide-out portion rather than on the vehicle, and a drive shaft weather seal.

FIG. 1 shows a travel trailer 16 type of recreational vehicle. This travel trailer includes an internal compartment to receive users and provide a space for shelter, dining, or sleeping. The trailer also includes an outer wall, e.g. in a generally vertical plane.

A slide-out portion is mounted to the trailer, and is movable between open and closed positions. In open positions, the slide-out portion increases the usable space of the compartment. The slide-out portion includes an outer wall, e.g. in a generally vertical plane. In closed positions of the slide-out portion, the outer wall of the slide-out portion can be flush with the outer wall of the trailer, meaning that they are in substantially the same, e.g. vertical, plane.

The slide-out portion can be contained with a mounting structure having a peripheral frame. When assembling the vehicle, once the opening for the slide-out portion is made, the slide-out portion can be attached to the vehicle by securing the peripheral frame to the vehicle. The frame can include therein a continuous seal, which may be of a conventional nature, which extends along the entire periphery of the slide-out portion. The slide-out portion can include radiussed corners. Since the seal does not have to travel past any right angle corners, it does not need to be cut and/or overlapped at the corners.

The drive mechanism for moving the slide-out portion in and out of the vehicle can include as its motive power source, for example, four electrical motors mounted in association with each of the radiussed corners. These motors can each be connected to cause rotation of threaded drive shafts (or drive screws) which are mounted between the motors and brackets connected to the frame. In order to protect the drive shafts from the environment and to prevent inadvertent contact between users and the drive shafts, the drive shafts can each be covered with a flexible weather seal. This weather seal can, for example, be formed from two longitudinally extending rubber strips which form an overlap connection from top to bottom adjacent the drive shafts. These strips can be flexible enough to allow the bracket connection to separate the strips as the slide-out portion moves past the brackets, but can be resilient enough to close that connection once away from the brackets.

Specific examples or embodiments of slide-out room and operating mechanism and components thereof have been described herein. Various modifications and changes may be made thereto without departing from the essence of the invention, as defined by the claims appended hereto. For the purpose of clarity and a concise description, features are described herein as part of the same or separate embodiments. However, alternative embodiments having combinations of all or some of the features described in these separate embodiments are also envisaged. It will be appreciated that the scope of the invention may include embodiments having combinations of all or some of the features described. Other modifications, variations, and alternatives are also possible. The specifications, drawings and examples are, accordingly, to be regarded in an illustrative sense, rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system comprising:
    a mounting structure arranged for being attached to a vehicle wall proximate an opening in said wall; and
    a slide-out room slidingly connected to the mounting structure for translation through the opening, the slide-out room comprising:
        a motor mounted on the slide-out room and movable therewith, a drive block mounted to the mounting structure and slidingly received within a first channel, and a drive screw connected to the motor and threadingly engaged to the drive block.

2. The system of claim 1, further including a second motor connected to a second drive block via a second drive screw directly or through an intervening gear train.

3. The system of claim 2 further comprising a controller electrically connected to the motor and the second motor, the controller controlling the operation of the motor and the second motor.

4. The system of claim 2 wherein the first channel is defined by a first body.

5. The system of claim 2 further comprising a first drive screw seal substantially covering the drive screw and/or the first channel.

6. The system of claim 5 wherein the first drive screw seal comprises a first seal member and a second seal member overlapping the first seal member.

7. The system of claim 2 wherein the first motor is associated with a first corner unit, the second motor is associated with a second corner unit, and the slide-out room further comprises:
    a first panel connected between the first corner unit and the second corner unit.

8. The system of claim 1 wherein the drive block associated with the drive screw comprises complementary drive threads, the complementary drive threads having a thread pitch that precludes rotation of the drive screw solely in response to a longitudinal load applied thereto by the drive block.

9. The system of claim 1 further comprising a perimeter seal disposed in one of the mounting structure and the slide out portion, the perimeter seal configured to selective engage with both the mounting structure and the slide out room simultaneously.

10. The system of claim 1, further including a third motor connected to the third drive block via a third drive screw directly or through an intervening gear train.

11. The system of claim 10 further including a fourth motor connected to a fourth drive block via a fourth drive screw directly or through an intervening gear train.

12. The system of claim 11, wherein the fourth motor is associated with a fourth corner unit, and wherein the slide-out room further comprises a third panel connected between the third corner unit and the fourth corner unit.

13. The system of claim 12 wherein the slide-out room further comprises a fourth panel connected between the fourth corner unit and the first corner unit.

14. The system of claim 13 wherein the first panel is a floor, the second panel is a first side wall, the third panel is a ceiling, and the fourth panel is a second side wall opposite the first wall.

15. The system of claim 10 wherein the third motor is associated with a third corner unit, and the slide-out room further comprises a second panel connected between the second corner unit and the third corner unit.

16. The system of claim 15 wherein the slide-out portion further comprises a third panel connected between the second corner unit and the first corner unit.

* * * * *